(12) United States Patent
Kwon et al.

(10) Patent No.: US 10,409,424 B2
(45) Date of Patent: Sep. 10, 2019

(54) MOBILE TERMINAL AND METHOD FOR CONTROLLING THE SAME

(71) Applicant: LG ELECTRONICS INC., Seoul (KR)

(72) Inventors: Yunmi Kwon, Seoul (KR); Kiseon Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 136 days.

(21) Appl. No.: 15/502,666

(22) PCT Filed: Jul. 31, 2015

(86) PCT No.: PCT/KR2015/008042
§ 371 (c)(1),
(2) Date: Feb. 8, 2017

(87) PCT Pub. No.: WO2017/014348
PCT Pub. Date: Jan. 26, 2017

(65) Prior Publication Data
US 2017/0235431 A1   Aug. 17, 2017

(30) Foreign Application Priority Data
Jul. 21, 2015   (KR) .................. 10-2015-0103301

(51) Int. Cl.
*G06F 3/042*  (2006.01)
*G06F 3/041*  (2006.01)
(Continued)

(52) U.S. Cl.
CPC .......... *G06F 3/0425* (2013.01); *G06F 1/1637* (2013.01); *G06F 1/1686* (2013.01);
(Continued)

(58) Field of Classification Search
CPC .. G06F 1/1686; G06F 3/04883; G06F 3/0425; G06F 3/0421; G06F 3/0416; G06F 3/0487; G06F 3/04842; G06F 1/1637; G06F 3/042; G06F 3/041; G06F 2203/04104; G06F 3/0482; G06F 2203/04808; G06F 3/0412; G06F 2203/04108;
(Continued)

(56) References Cited

U.S. PATENT DOCUMENTS

2009/0295943 A1  12/2009  Kim et al.
2009/0295976 A1  12/2009  Choi
(Continued)

FOREIGN PATENT DOCUMENTS

KR   10-2009-0106755 A   10/2009
KR   10-2009-0124325 A   12/2009
KR   10-1093088 B1       12/2011

*Primary Examiner* — Vinh T Lam
(74) *Attorney, Agent, or Firm* — Birch, Stewart, Kolasch & Birch, LLP

(57) ABSTRACT

Disclosed herein are a mobile terminal and a method of controlling the same. Embodiments of the present invention provide a mobile terminal and a method of controlling the same, which are capable of simply controlling an object placed at the back of a transparent display by controlling the distance between the transparent display and the object in the state in which the object has been reflected in the transparent display.

17 Claims, 27 Drawing Sheets

(51) Int. Cl.
*G06F 3/0488* (2013.01)
*G06F 3/0487* (2013.01)
*H04N 5/232* (2006.01)
*G06F 3/0484* (2013.01)
*G06F 1/16* (2006.01)
*G06F 3/0482* (2013.01)

(52) U.S. Cl.
CPC .......... *G06F 3/0416* (2013.01); *G06F 3/0421* (2013.01); *G06F 3/0487* (2013.01); *G06F 3/04842* (2013.01); *G06F 3/04883* (2013.01); *H04N 5/23293* (2013.01); *H04N 5/232127* (2018.08); *H04N 5/232933* (2018.08); *H04N 5/232939* (2018.08); *G06F 3/0412* (2013.01); *G06F 3/0482* (2013.01); *G06F 2203/04104* (2013.01); *G06F 2203/04108* (2013.01); *G06F 2203/04808* (2013.01); *H04M 2250/52* (2013.01)

(58) Field of Classification Search
CPC ......... H04N 5/23293; H04N 5/232933; H04N 5/232939; H04N 5/232127; H04M 2250/52
See application file for complete search history.

(56) References Cited

U.S. PATENT DOCUMENTS

| | | | |
|---|---|---|---|
| 2015/0154801 A1* | 6/2015 | Lee | G06F 3/013 345/589 |
| 2016/0139714 A1* | 5/2016 | Hsiao | G09G 3/20 345/173 |
| 2017/0060485 A1* | 3/2017 | Krilivsky | G06Q 30/0621 |

\* cited by examiner

[Fig. 1]
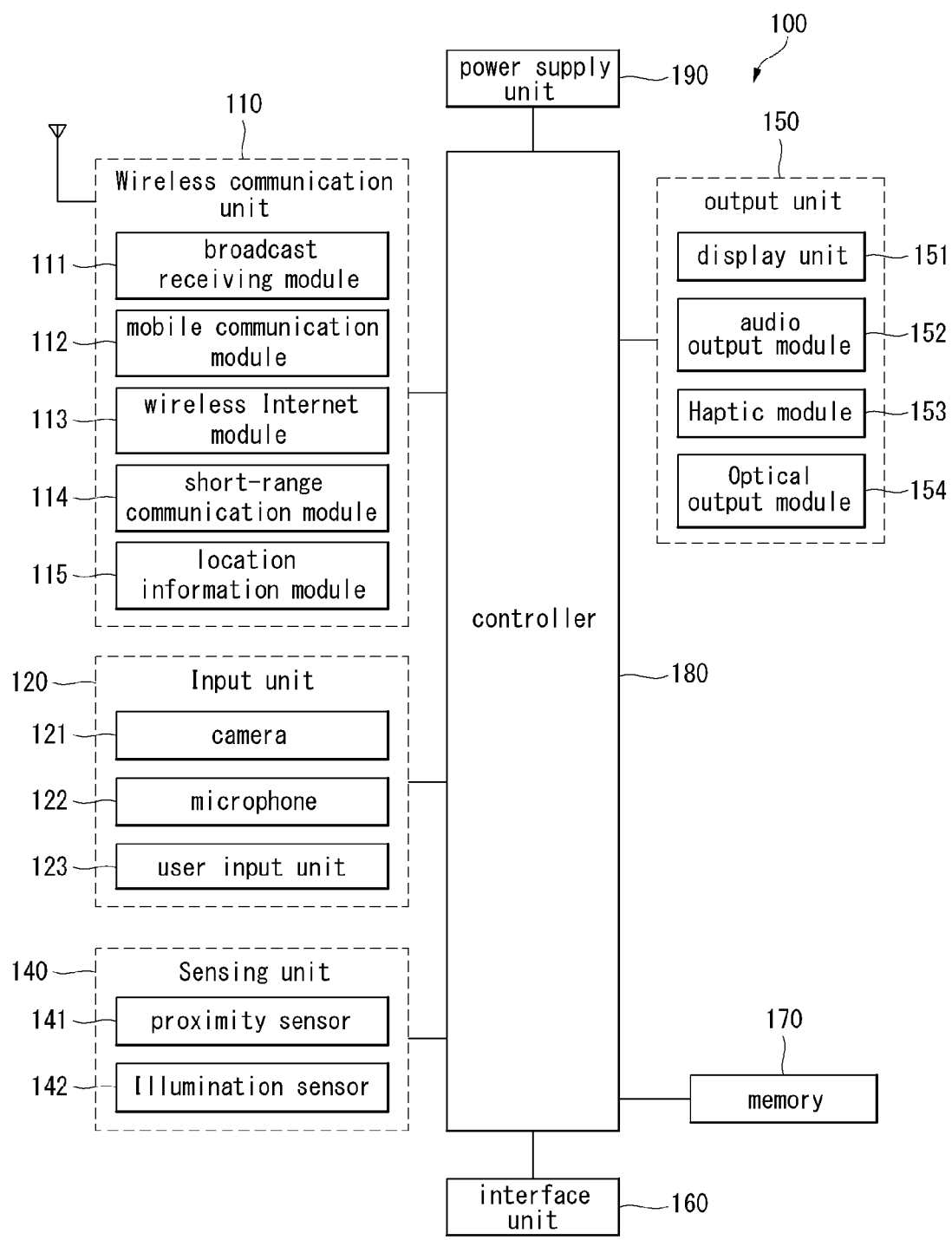

[Fig. 2a]
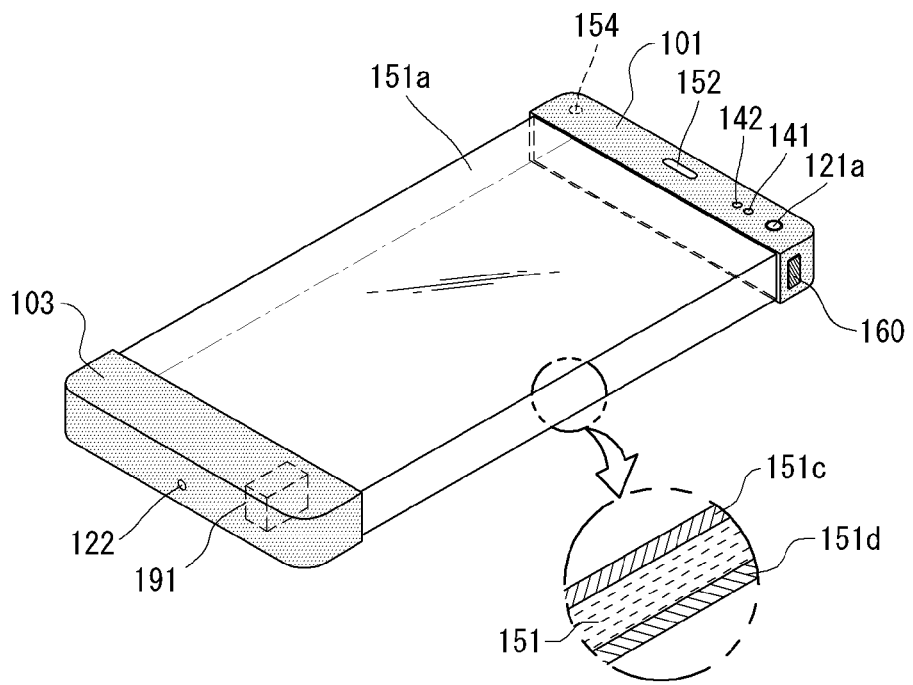
[Fig. 2b]
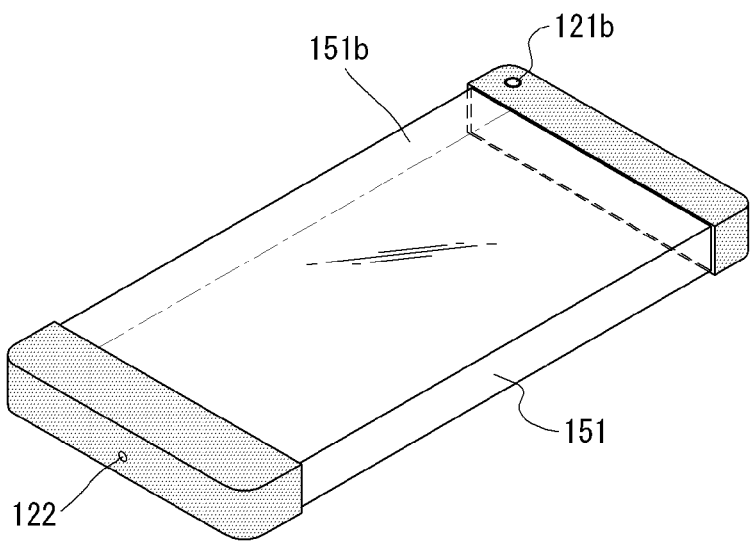

[Fig. 2c]
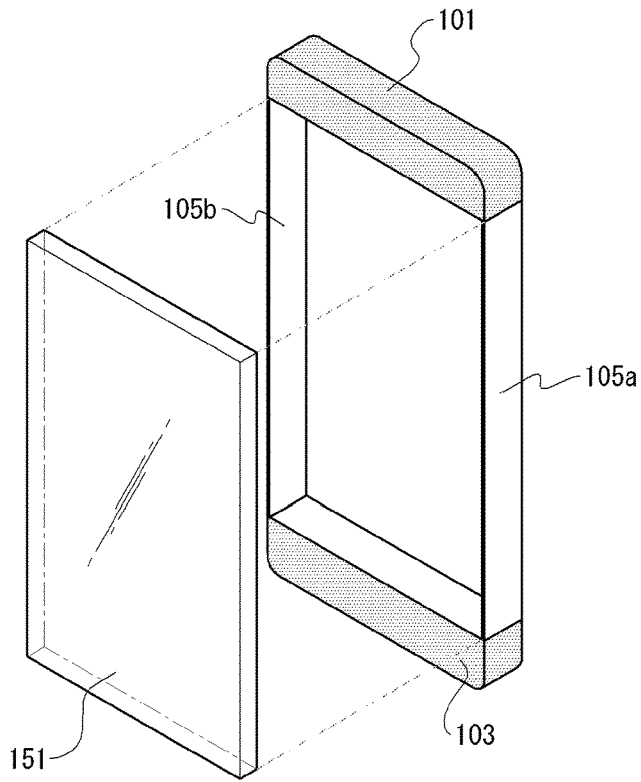
[Fig. 3]
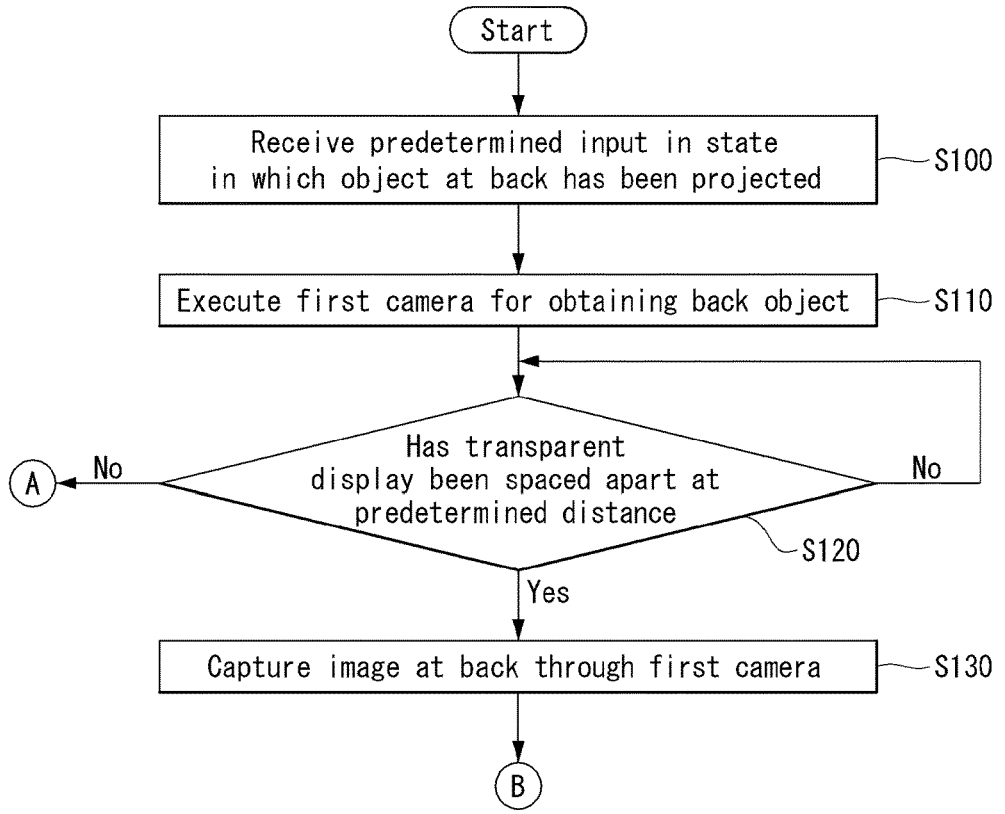

[Fig. 4]
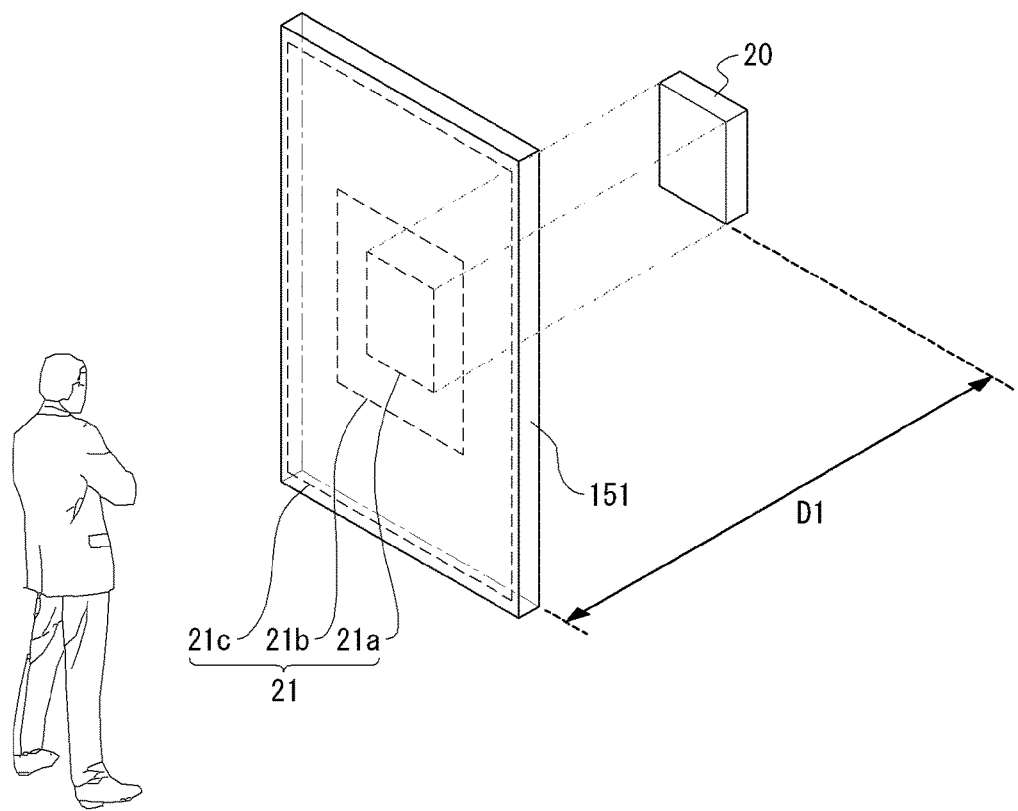

[Fig. 5]
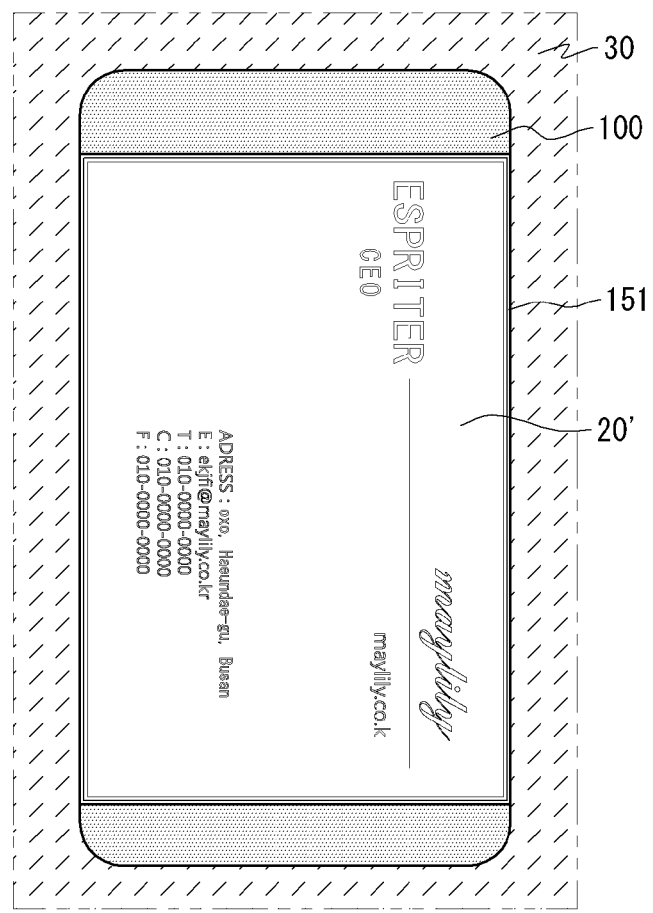
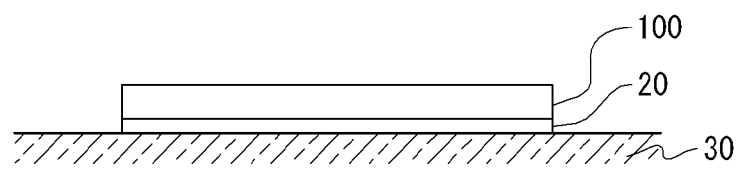

[Fig. 6a]
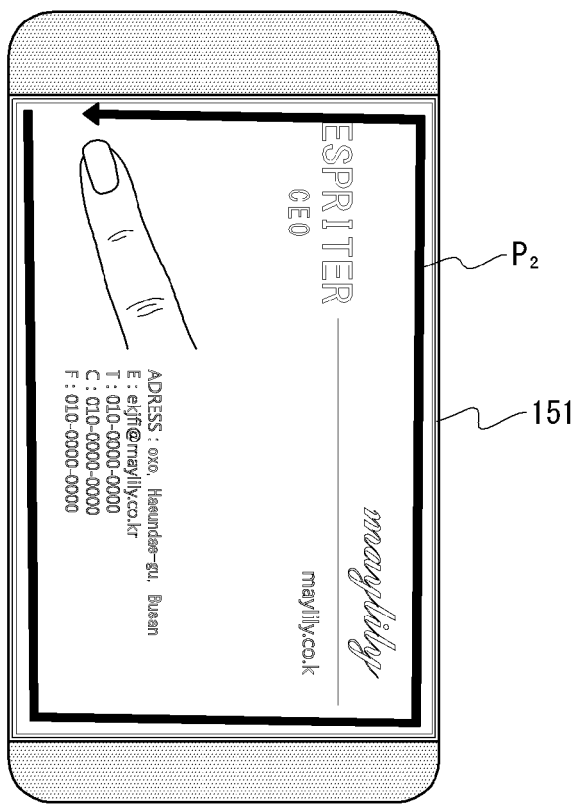
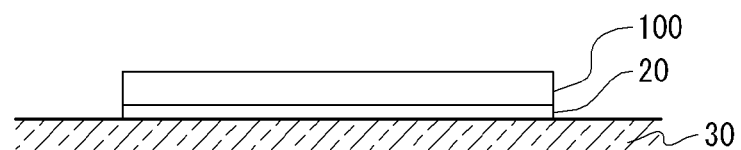

[Fig. 6b]
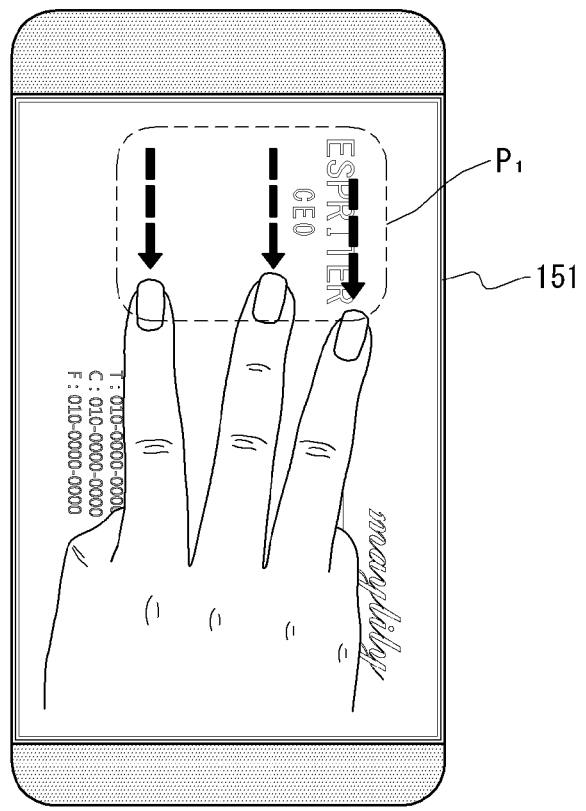
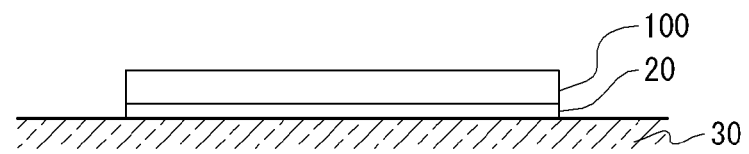

[Fig. 7]
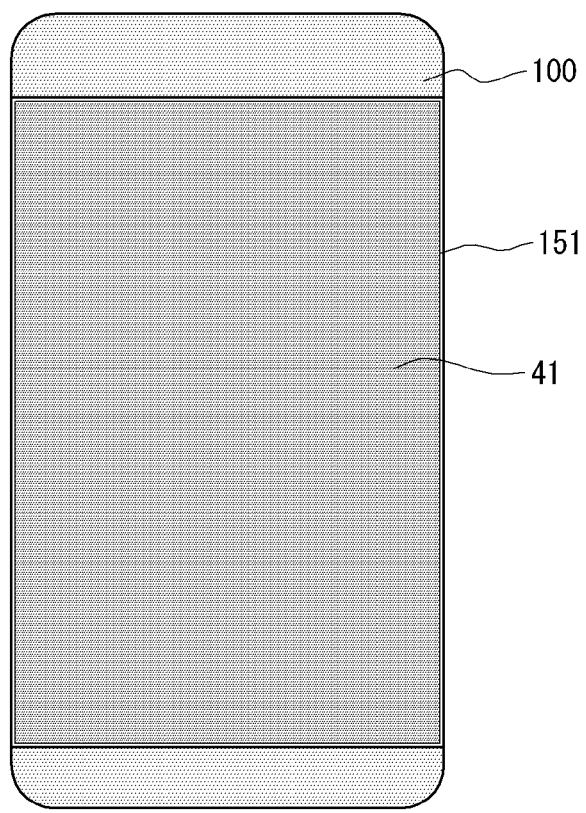
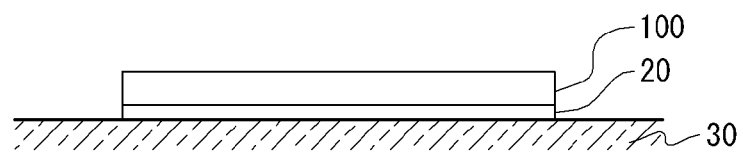

[Fig. 8a]
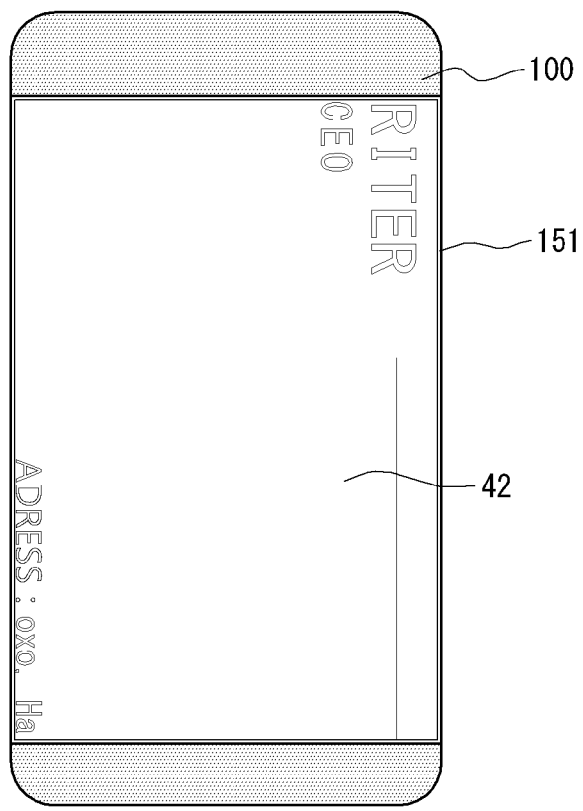
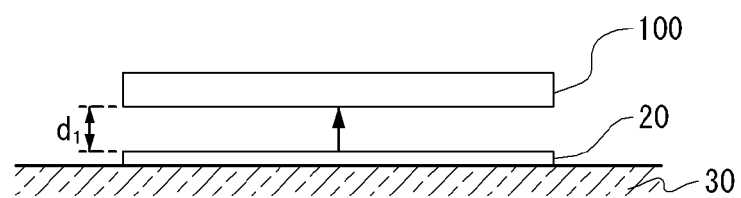

[Fig. 8b]
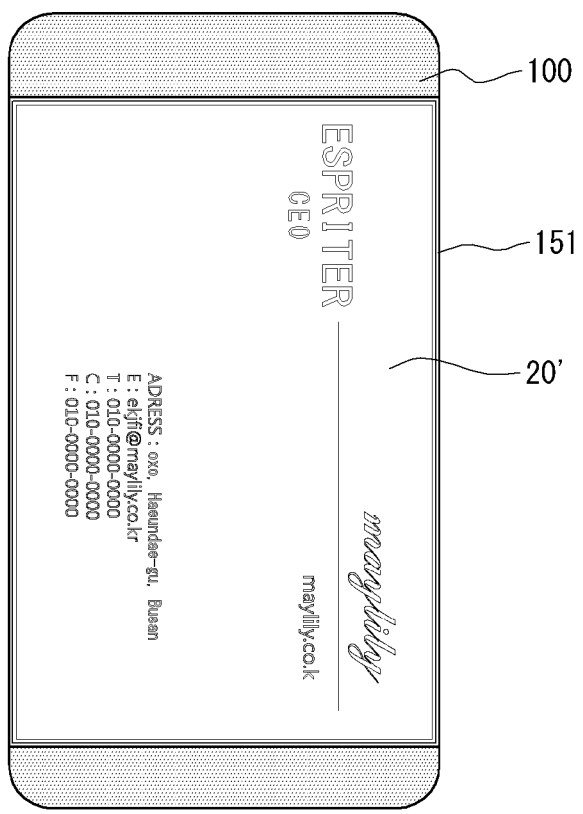
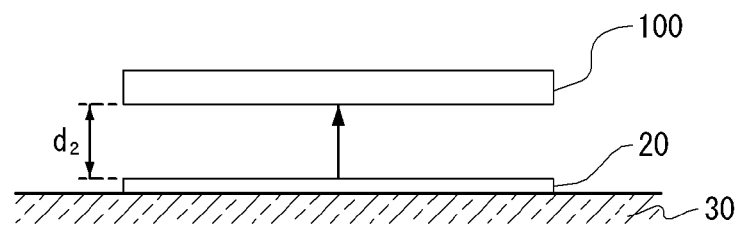

[Fig. 8c]
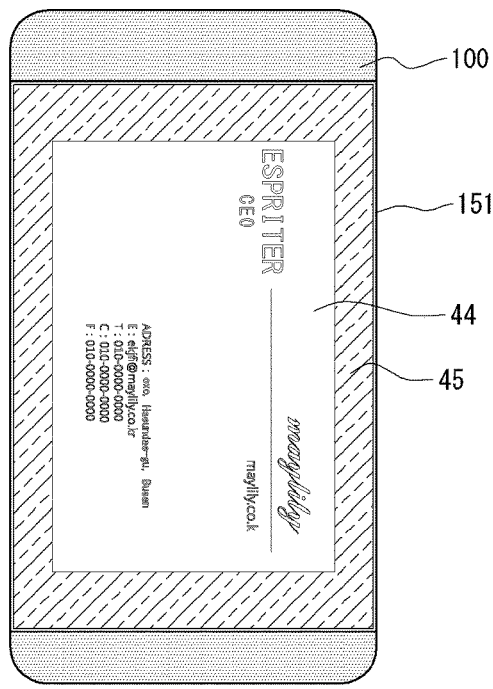
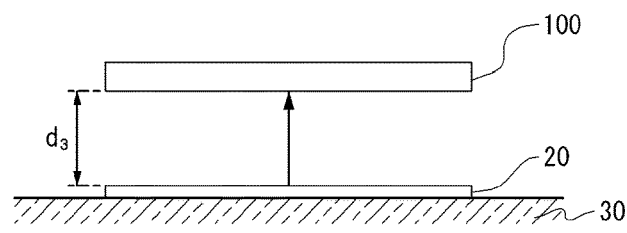
[Fig. 9]
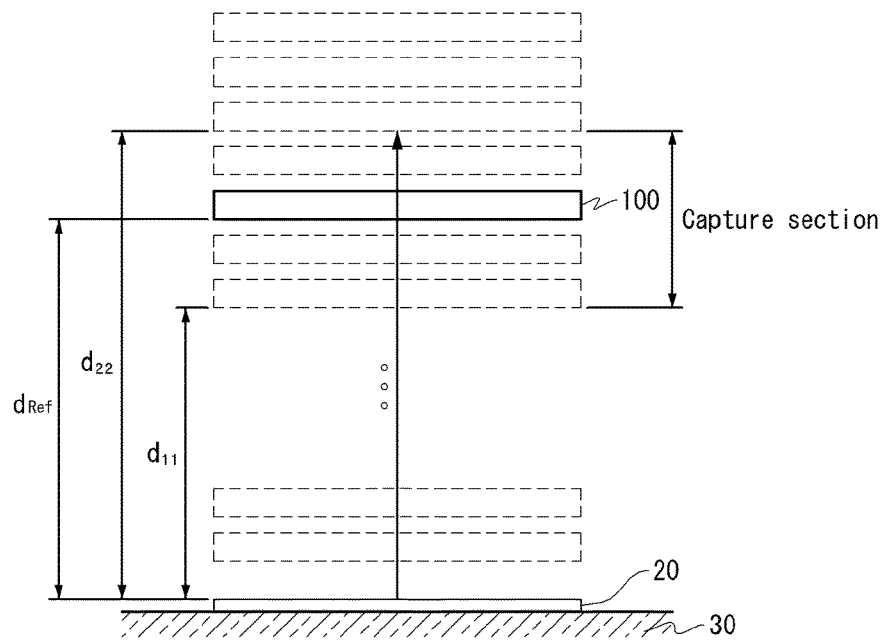

[Fig. 10]
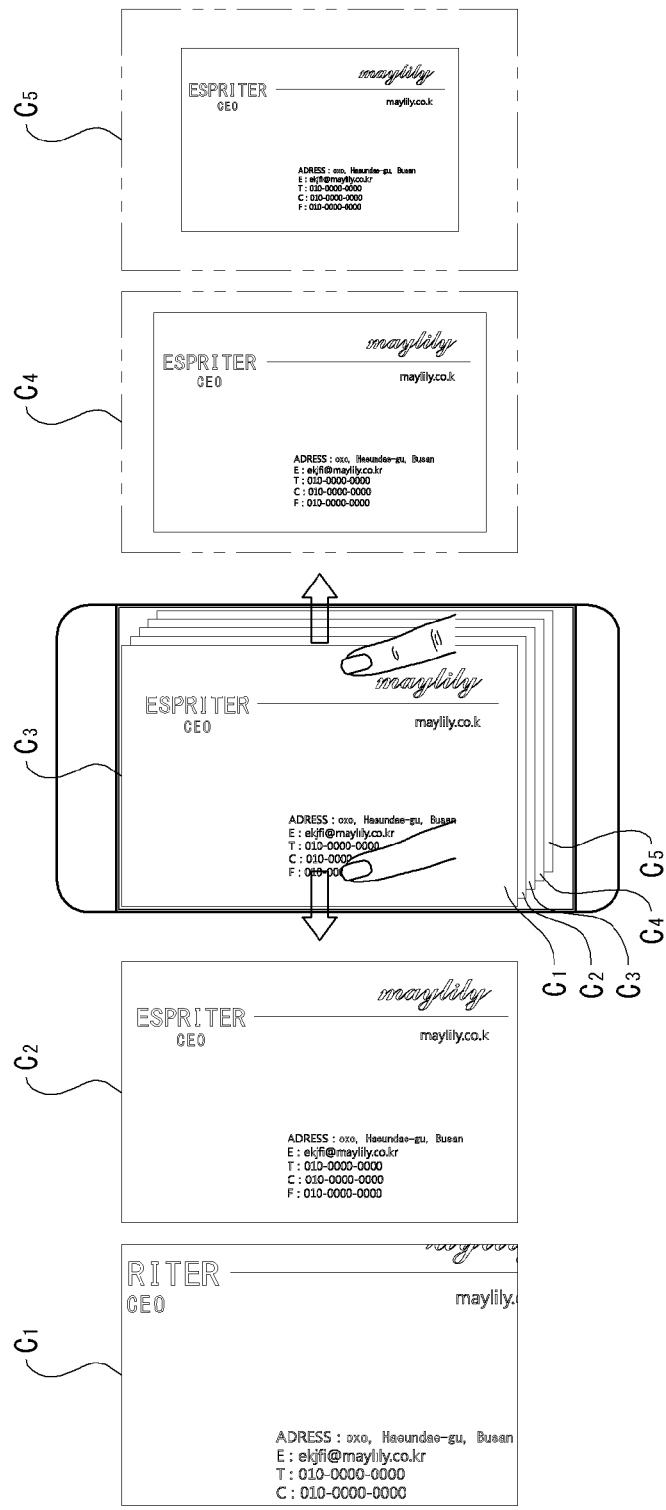

[Fig. 11]
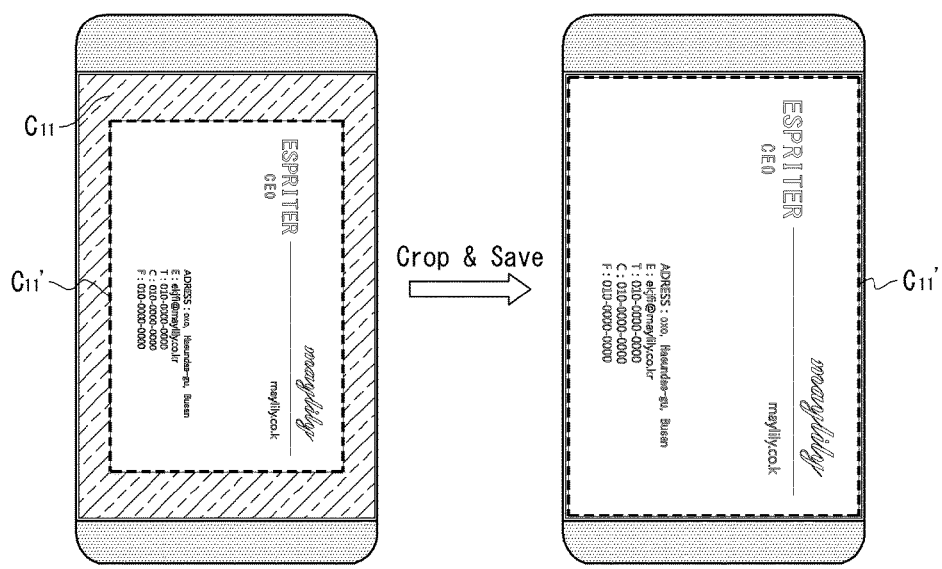
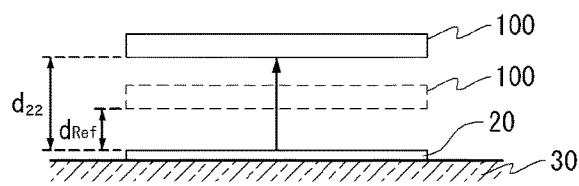

[Fig. 12]
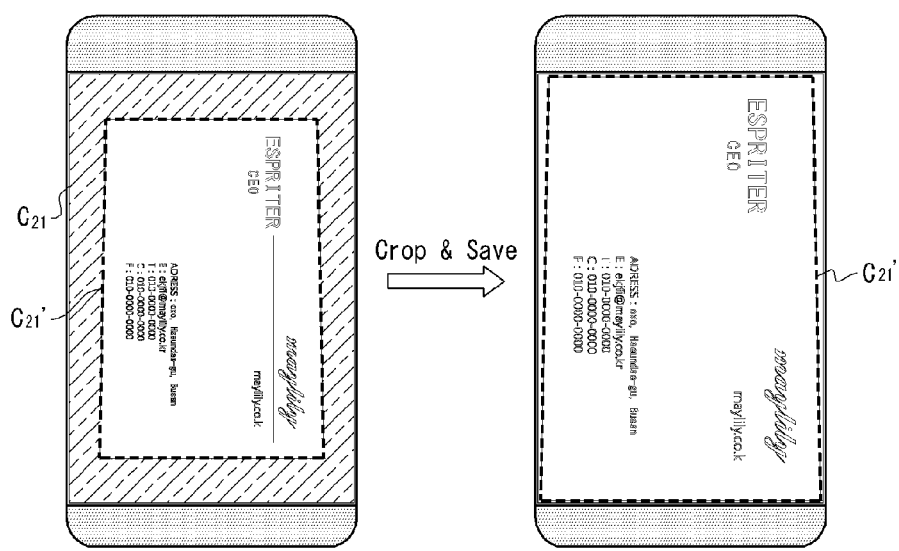
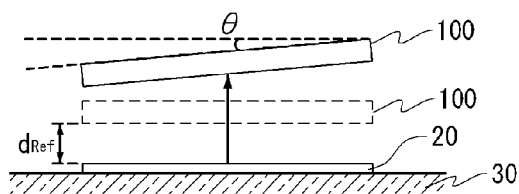

[Fig. 13a]
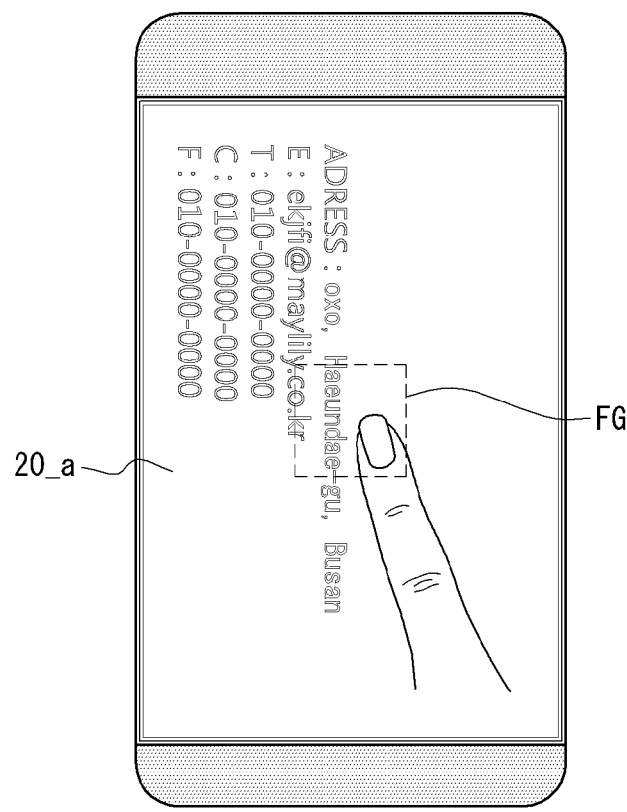
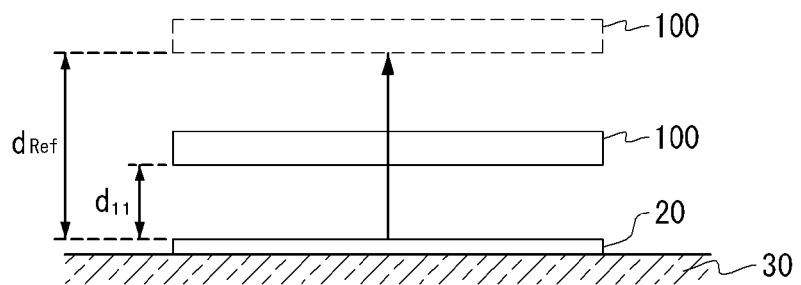

[Fig. 13b]
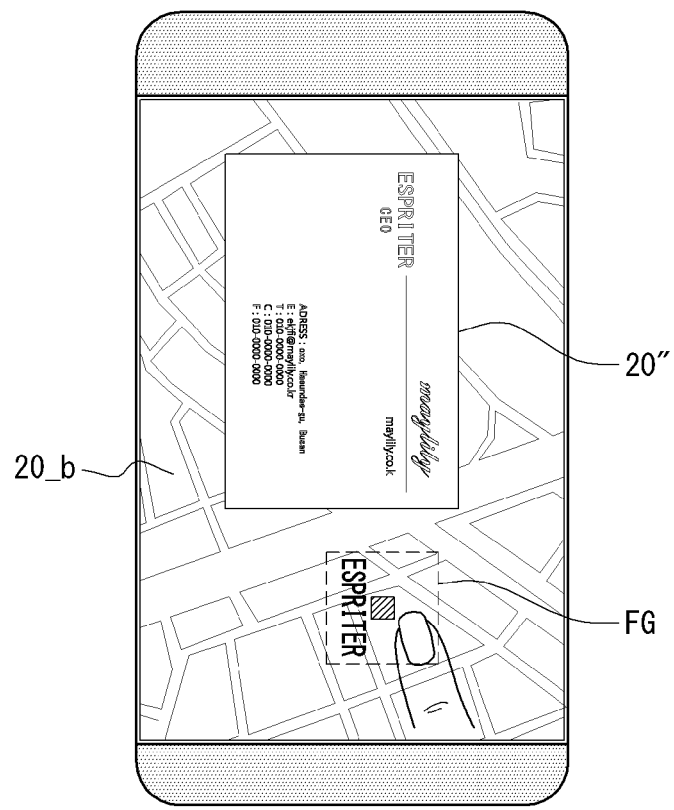
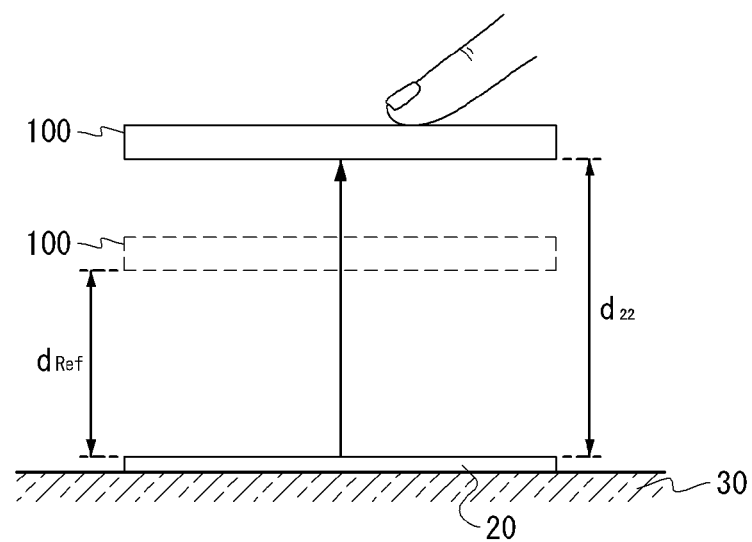

[Fig. 14a]
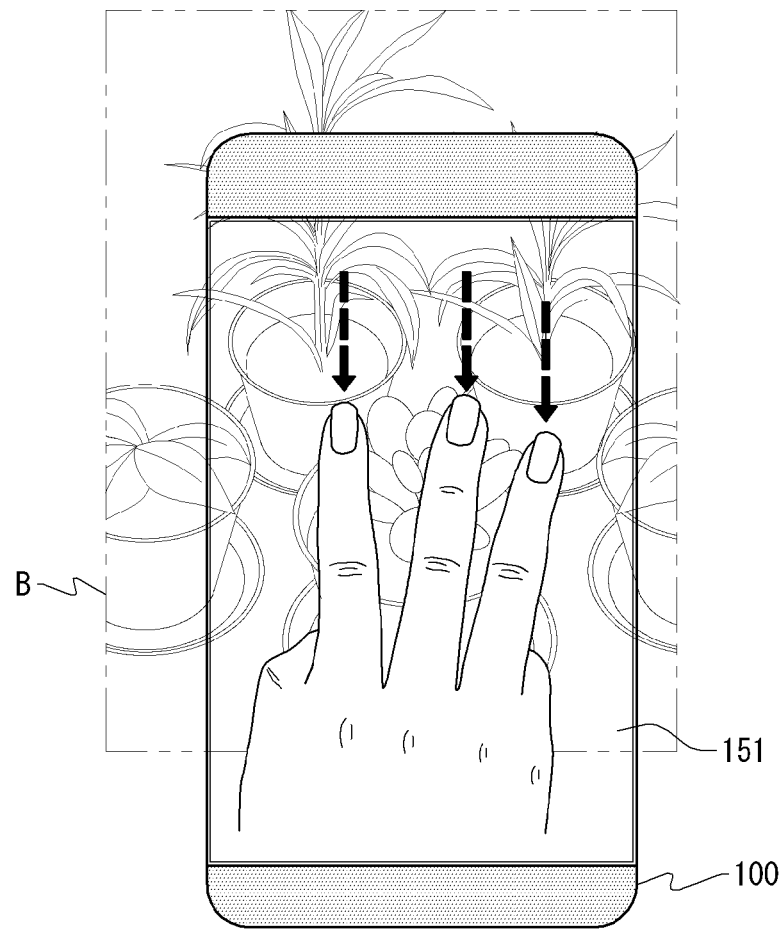
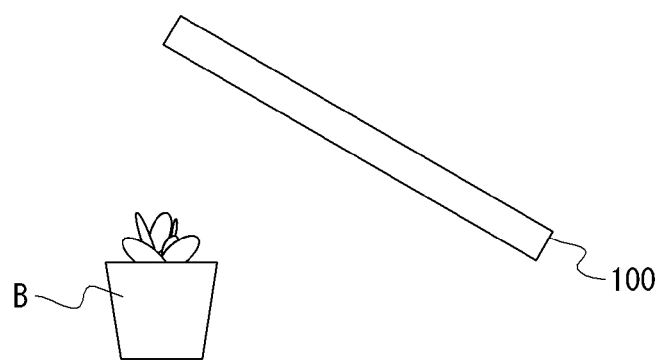

[Fig. 14b]
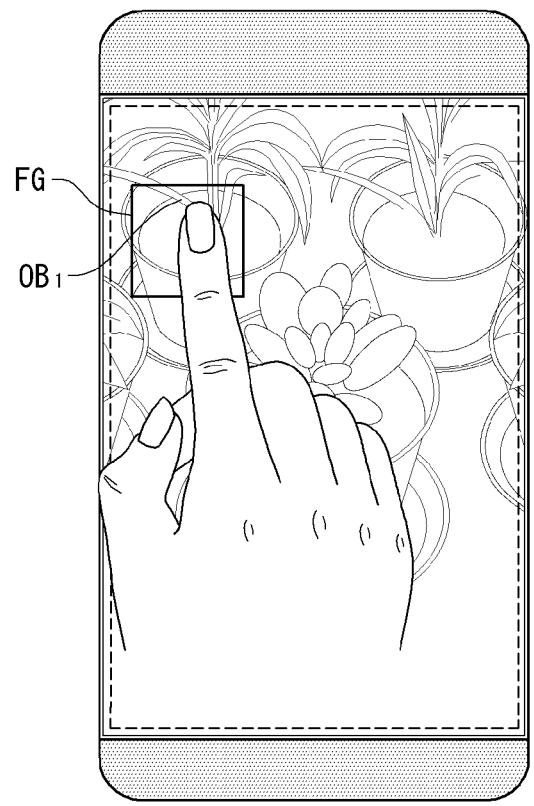
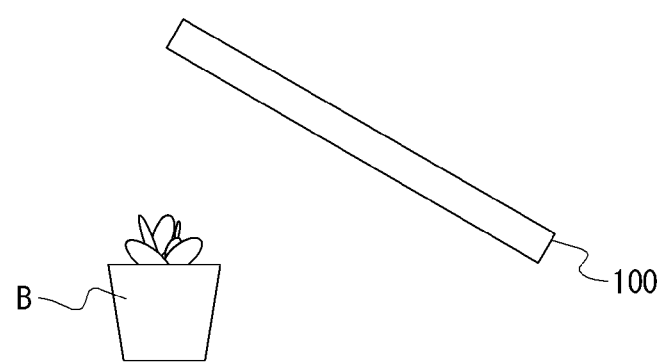

[Fig. 14c]
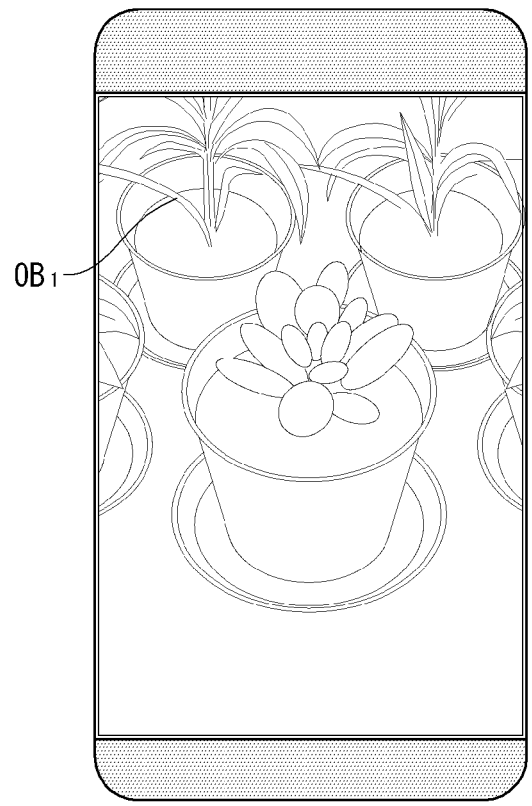
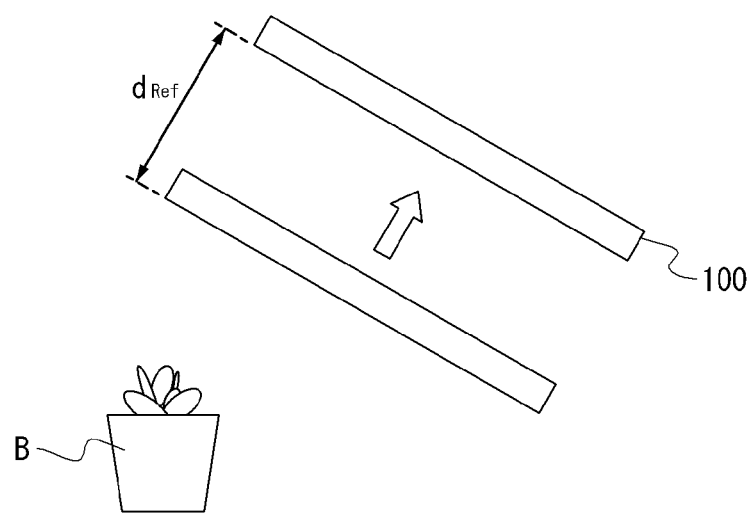

[Fig. 15a]
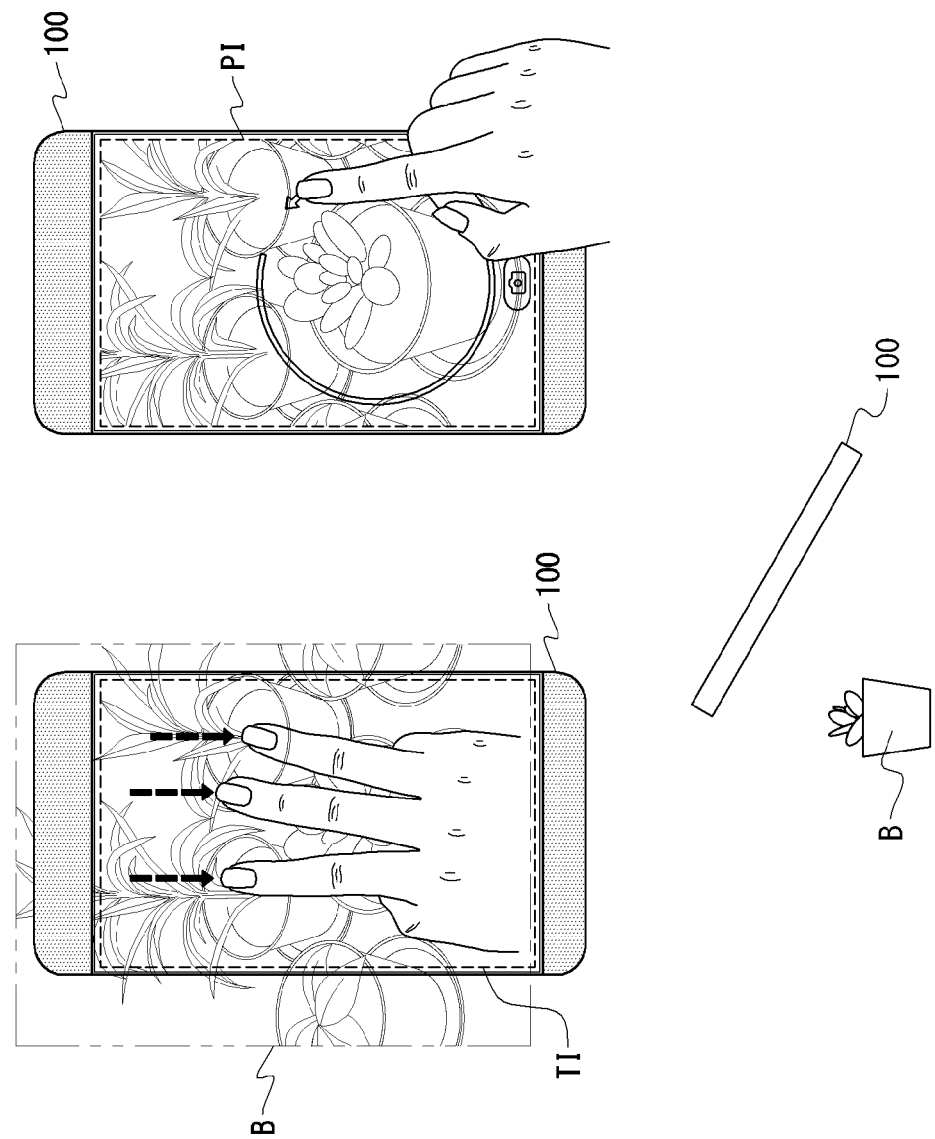

[Fig. 15b]
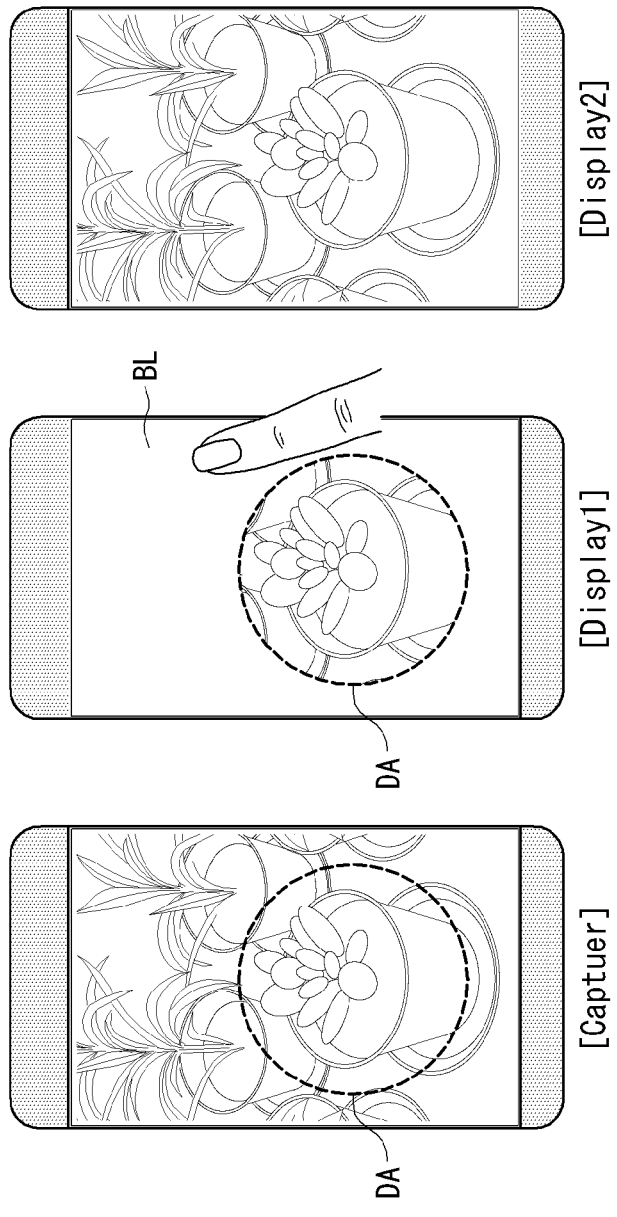
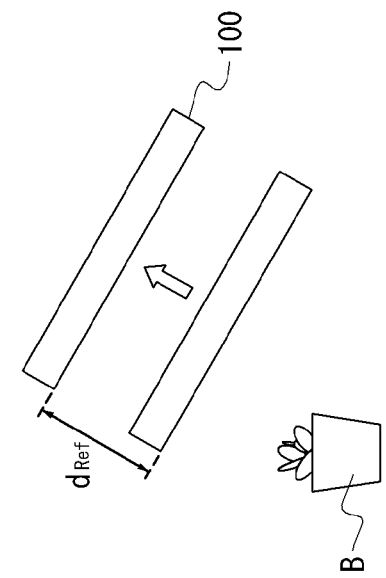

[Fig. 16]
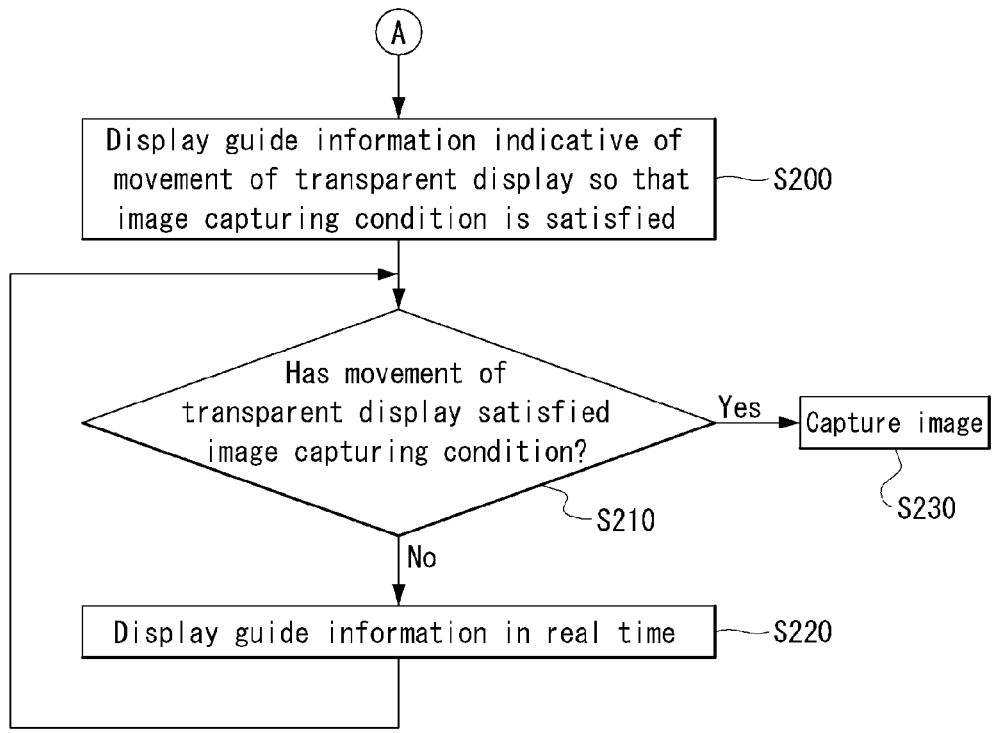
[Fig. 17a]
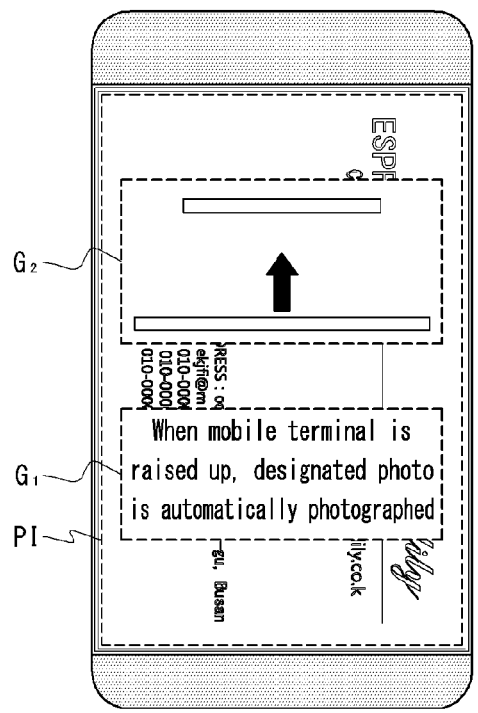

[Fig. 17b]
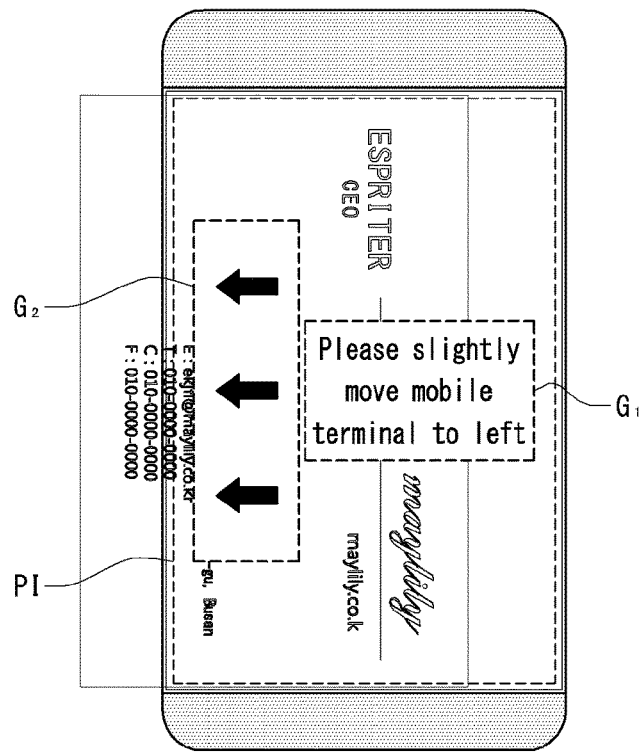
[Fig. 18a]
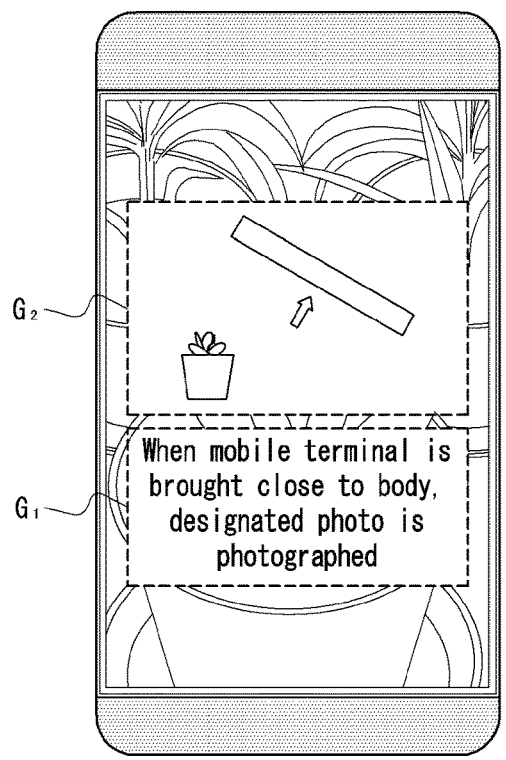

[Fig. 18b]
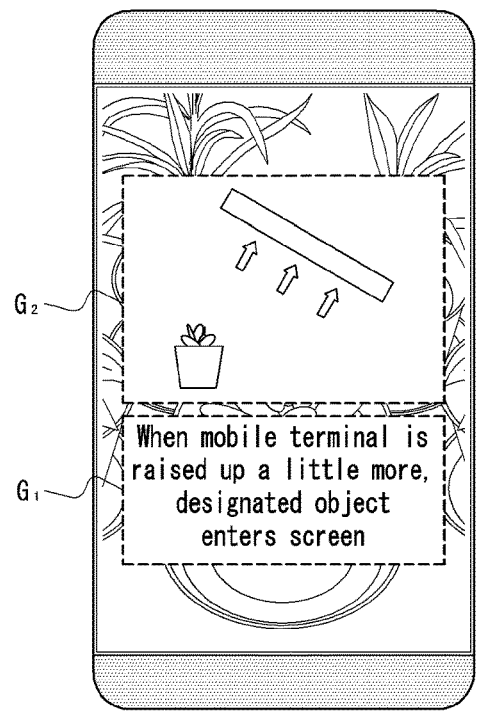
[Fig. 19]
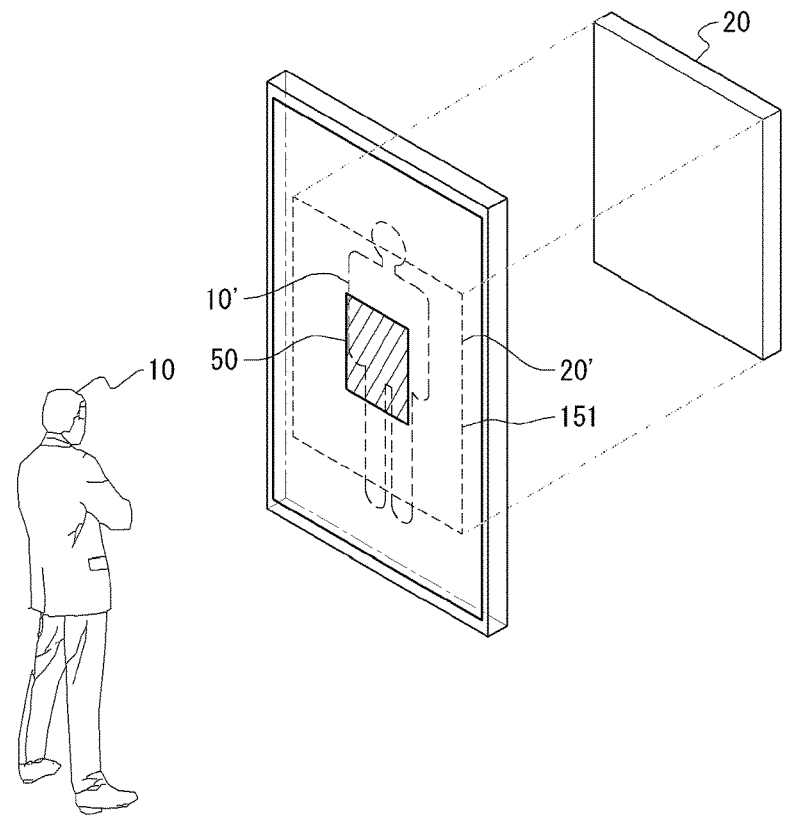

[Fig. 20a]
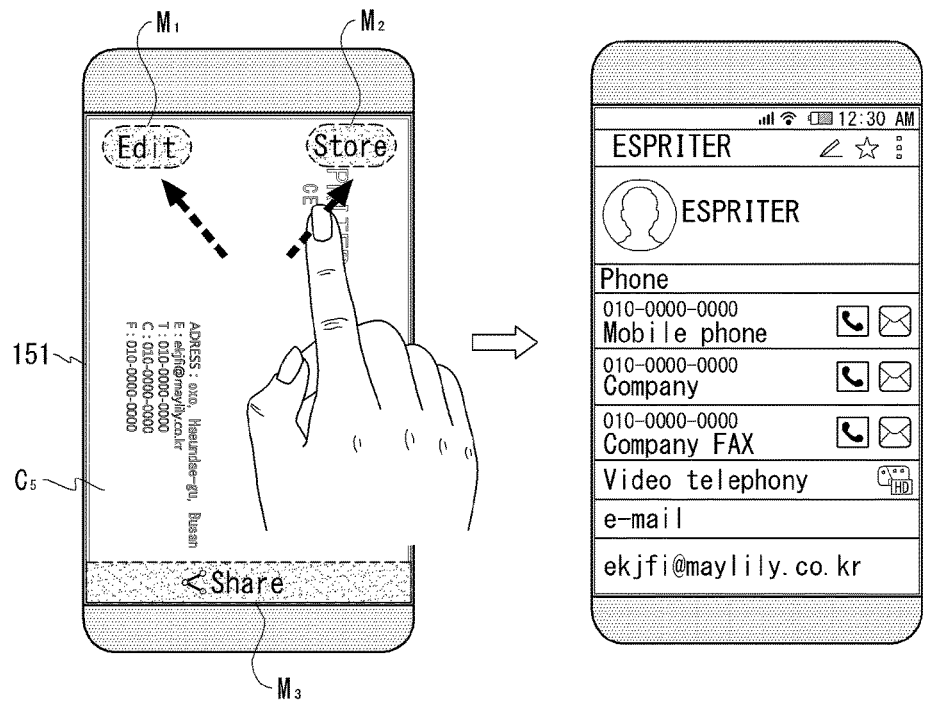
[Fig. 20b]
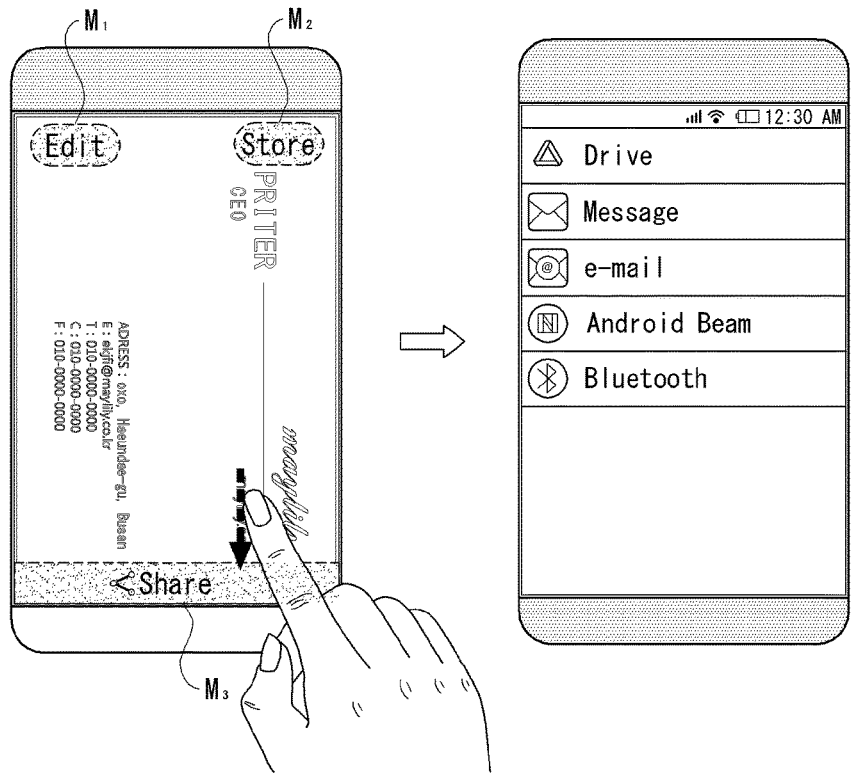

[Fig. 20c]
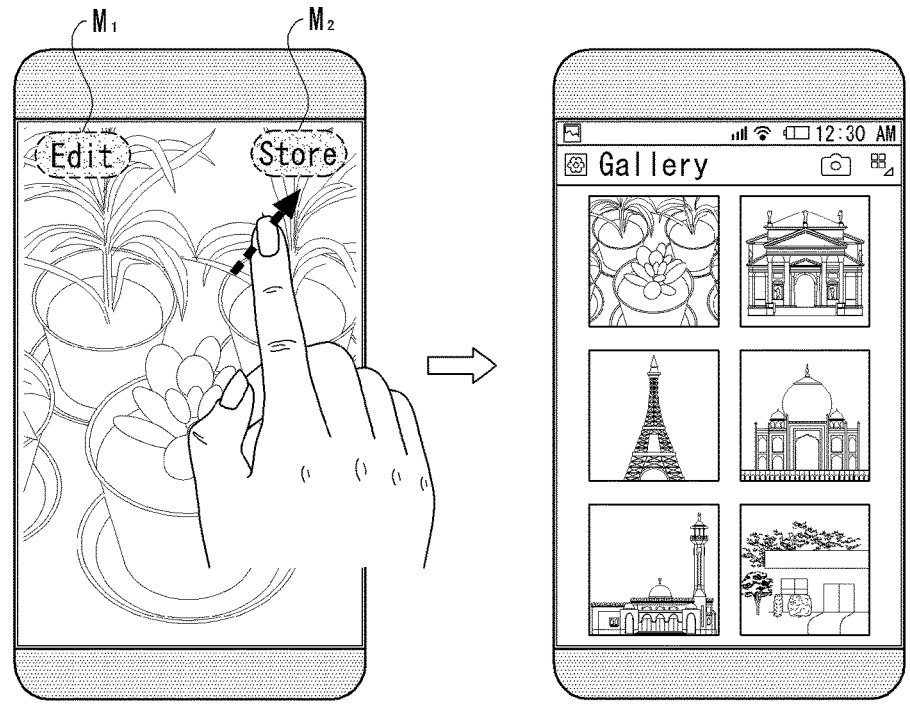
[Fig. 20d]
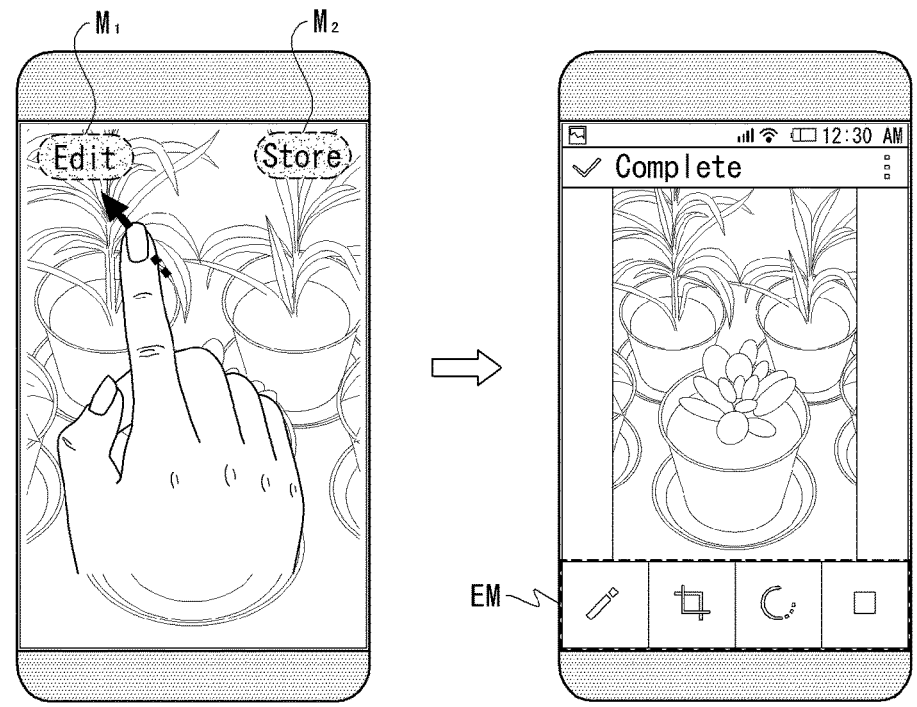

[Fig. 21]
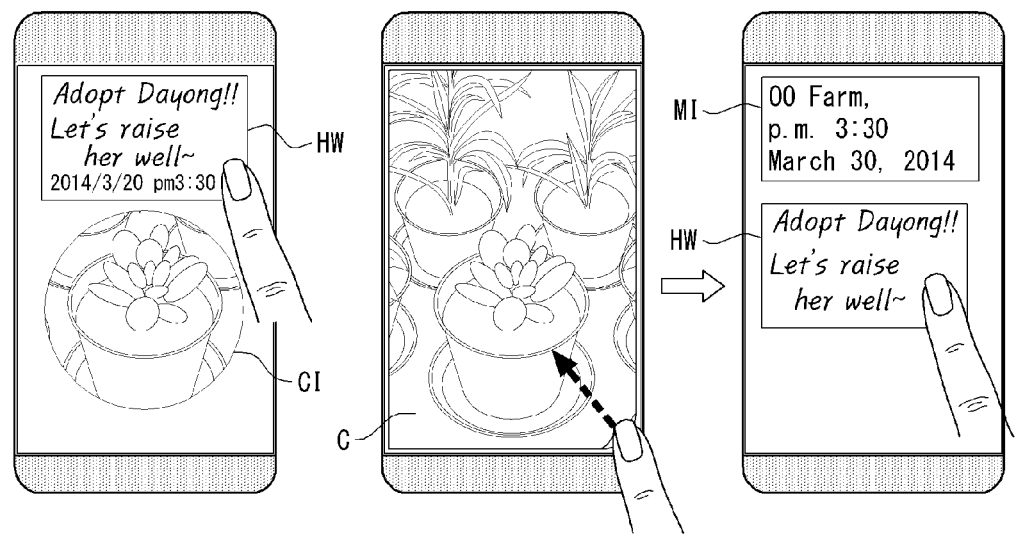
[Fig. 22]
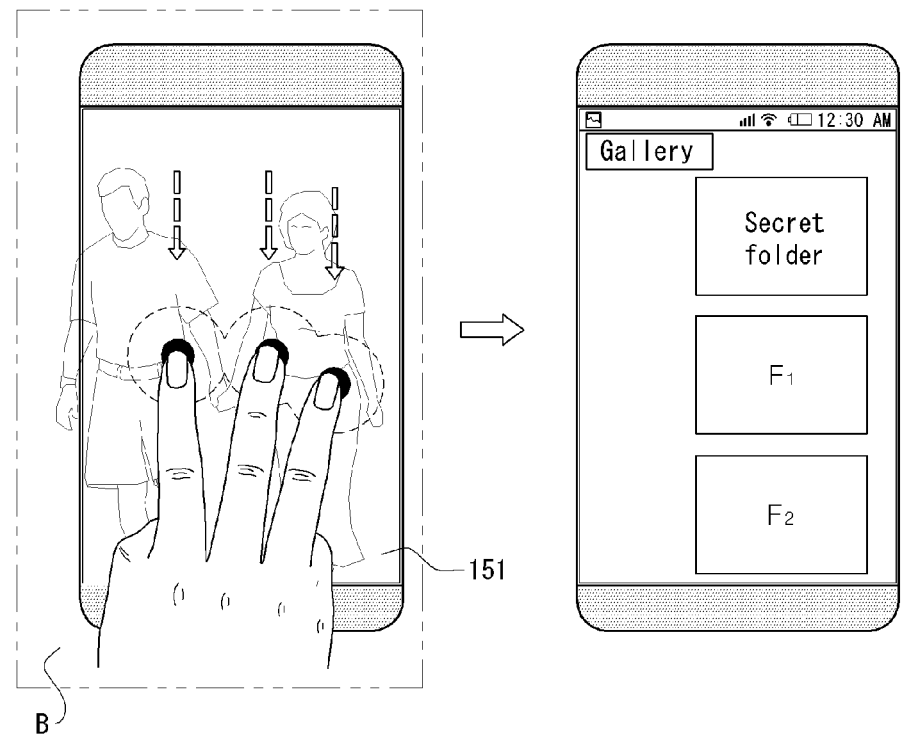

MOBILE TERMINAL AND METHOD FOR CONTROLLING THE SAME

CROSS REFERENCE TO RELATED APPLICATIONS

This application is the National Phase of PCT/KR2015/008042 filed on Jul. 31, 2015, which claims priority under 35 U.S.C. § 119(a) to Patent Application No. 10-2015-0103301 filed in the Republic of Korea on Jul. 21, 2015, all of which are hereby expressly incorporated by reference into the present application.

TECHNICAL FIELD

The present invention relates to a mobile terminal including a transparent display and a method of controlling the same.

BACKGROUND ART

As the display technology is in progress, a next-generation display device, such as an electronic device including a transparent display, is recently in discussion.

A transparent display reflects a background at the back thereof in the transparent display without a change because it has transparent properties. In a prior art, a display panel is fabricated using an opaque semiconductor compound, such as silicon (Si) or gallium arsenic (GaAs). However, as various application fields which cannot be handled by existing display panels are developed, the development of a new type of an electronic device is accelerated.

A device including a transparent display has transparent properties because it is implemented to include a transparent oxide semiconductor film. If a device including a transparent display is used, a user can view required information through a screen of the transparent display while viewing an object placed at the back of the device through the transparent display. Accordingly, a possible application paradigm exceeding the spatial and temporal restrictions of conventional display devices can be widened.

As a device including a transparent display may be used in various environments for various purposes, there is a need to develop a user interface capable of using the transparent display more effectively.

DISCLOSURE OF INVENTION

Solution to Problem

An object of the present invention is to provide a mobile terminal and a method of controlling the same, which provide a user interface which enables a user to control the mobile terminal more efficiently using the characteristics of a transparent display.

Another object of the present invention is to provide a mobile terminal and a method of controlling the same, which enable a user to capture a required image using a simple method without additional input in the state in which a transparent display has been deactivated.

Yet another object of the present invention is to provide a mobile terminal and a method of controlling the same, which are capable of obtaining a required image although there is a movement of the mobile terminal when an image is captured based on an image reflected in a transparent display.

Further another object of the present invention is to provide a mobile terminal and a method of controlling the same, which are capable of improving efficiency of image capture through a transparent display by providing photographing guide so that an image projected through the transparent display is accurately captured.

A mobile terminal in accordance with an aspect of the present invention includes a transparent display, a first camera configured to capture an image placed at the back of the transparent display, and a controller configured to execute the first camera when predetermined input to the transparent display is received in the state in which the object placed at the back of the transparent display has been reflected in the transparent display and to control the first camera so that the first camera captures an image if the transparent display is spaced apart from the object at a predetermined distance.

The state in which the object has been reflected in the transparent display may include a state in which power supply to the transparent display is off.

The transparent display may include a touch panel, and the predetermined input may include touch input having a specific pattern with respect to the touch panel.

The touch input having the specific pattern may include touch & drag input according to a multi-touch.

The predetermined distance may include a first distance between the transparent display and a virtual plane including the object before the first camera is spaced apart from the object when the entire object reflected in the transparent display is displayed on a preview screen according to the execution of the first camera at a point of time at which the first camera is executed.

The controller may be configured to additionally capture an image through the first camera in a second distance if the transparent display is additionally spaced apart from the object at a second distance exceeding the first distance after an image is captured in the first distance.

The controller may be configured to perform auto-focusing if the entire object is included in the transparent display.

The predetermined distance may include a vertical distance.

The controller may be configured to perform additional photographing on a section before and after a specific section based on a point of time at which the image is captured by the first camera.

The controller may be configured to separate only a reflected object region and store the separate region if the image captured by the first camera includes a region in addition to an object reflected in the transparent display before the first camera is executed.

The controller may be configured to perform focusing based on an object corresponding to a specific point on a preview screen of the first camera and to capture an image when touch input to the specific point is received.

In the case where the first camera is executed after touch input to designate a specific object in a screen projected onto the transparent display is received, the controller may be configured to separate only the designated specific object from the image captured by the first camera and display the separated object on the transparent display, if the specific object is included in the preview screen of the first camera while the transparent display is spaced apart from an actual object corresponding to the specific object.

The controller may be configured to display the image captured by the first camera, including the designated specific object, on the transparent display when predetermined input to the transparent display is received in the state in which only the specific object has been separated and displayed.

The controller may be configured to display guide information indicative of at least one of an isolation distance of the transparent display, an angle formed by the transparent display and the object, and a movement of the mobile terminal on the transparent display so that a condition in which an image is captured by the first camera is satisfied when the first camera is executed.

The controller may be configured to display the image captured by the first camera and at least one menu for processing the image on the transparent display.

The controller may be configured to display the image captured by the first camera on the transparent display and display a back of the displayed image on the transparent display when predetermined input is received with respect to the displayed image. The back of the image may include a screen in which handwriting input is possible.

The mobile terminal may further include at least one of an audio output module, a haptic module, and an optical output module, The controller may be configured to output a sound, vibration, or light for feeding image capture back through at least one of the audio output module, the haptic module, and the optical output module when the image is captured.

A method of controlling a mobile terminal includes receiving predetermined input to a transparent display in the state in which an object placed at the back of the transparent display has been reflected in the transparent display, executing a first camera configured to obtain an image at the back of the transparent display, and controlling the first camera so that the first camera captures an image if the transparent display is spaced apart from the object at a predetermined distance.

Advantageous Effects of Invention

The mobile terminal and the methods of controlling the mobile terminal according to the embodiments of the present invention have the following advantages.

In accordance with an embodiment of the present invention, there can be provided a user interface which enables a user to control the mobile terminal more efficiently using the characteristics of the transparent display.

Furthermore, in accordance with an embodiment of the present invention, an image required by a user can be captured using a simple method without additional input in the state in which the transparent display has been deactivated.

Furthermore, in accordance with an embodiment of the present invention, a required image can be obtained although there is a movement of the mobile terminal because an image is captured based on an image projected through the transparent display.

Furthermore, in accordance with an embodiment of the present invention, efficiency of image capture can be improved through the transparent display because a photographing guide is provided so that an image projected through the transparent display is accurately captured.

Furthermore, in accordance with an embodiment of the present invention, a quick shot in which a required image is provided using a simpler method through the transparent display at a desired point of time is made possible.

BRIEF DESCRIPTION OF DRAWINGS

FIG. 1 is a block diagram illustrating a mobile terminal related to an embodiment of the present invention.

FIGS. 2a to 2c are conceptual diagrams of an example of the mobile terminal related to an embodiment of the present invention, which are viewed in different directions.

FIG. 3 is a flowchart illustrating a method of controlling the mobile terminal in accordance with an embodiment of the present invention.

FIG. 4 is a diagram showing the state in which a back object is projected through a transparent display.

FIGS. 5 to 6b are diagrams illustrating step S100 of FIG. 3.

FIG. 7 is a diagram showing the shape of a transparent display in the state in which a camera has been executed.

FIGS. 8a to 8c are diagrams illustrating an example in which an image is captured depending on the distance of the mobile terminal in accordance with the first embodiment of the present invention from a back object.

FIGS. 9 and 10 are diagrams illustrating an example in which continuous photographing is performed depending on the distance of the mobile terminal in accordance with the first embodiment of the present invention from a back object.

FIG. 11 is a diagram illustrating an example of an image processing method if an image is captured away from a designation distance between the mobile terminal in accordance with the first embodiment of the present invention and a back object.

FIG. 12 is a diagram illustrating an example of an image processing method if an image is captured away from a designation angle formed between the mobile terminal in accordance with the first embodiment of the present invention and a back object.

FIGS. 13a to 13b are diagrams illustrating an example in which an image is captured in the state in which the mobile terminal in accordance with the first embodiment of the present invention has deviated from a designation distance between the mobile terminal and a back object.

FIGS. 14a to 14c are diagrams illustrating an example in which an image is captured in accordance with a second embodiment of the present invention.

FIGS. 15a to 15b are diagrams illustrating another example in which an image is captured in accordance with the second embodiment of the present invention.

FIG. 16 is a flowchart illustrating a method of controlling the mobile terminal in accordance with a third embodiment of the present invention.

FIGS. 17a to 18b are diagrams illustrating an example in which guide information for image capture is provided in accordance with the third embodiment of the present invention.

FIG. 19 is a diagram illustrating an example in which guide information is displayed in accordance with the third embodiment of the present invention.

FIGS. 20a to 21 are diagrams illustrating examples in which images captured through the mobile terminal are used in accordance with an embodiment of the present invention.

FIG. 22 is a diagram illustrating a method of controlling the mobile terminal in accordance with a fourth embodiment of the present invention.

MODE FOR THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal in accordance with an embodiment of the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE) , LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user?s fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 2a and 2c, the disclosed mobile terminal 100 includes a bar type terminal body. However, an embodiment of the present invention is not limited to the bar type terminal body and may be applied to various structures, such as a watch type, a clip type, a glass type, or a folder type, a flip type, a slide type, a swing type, and a swivel type in which two or more bodies are coupled in such a way as to be relatively moved. An embodiment of the present invention will be related to a specific type of the mobile terminal, but a description regarding a specific type of the mobile terminal may be commonly applied to other types of mobile terminals.

In this case, the mobile terminal 100 is considered to be at least one assembly, and the terminal body may be understood as a concept that denotes the at least one assembly.

The mobile terminal 100 in accordance with an embodiment of the present invention may include a transparent display 151 and a first housing 101 and a second housing 103 configured to support the transparent display 151 at the top and bottom of the transparent display 151.

The transparent display 151 may not include a rear casing because the back needs to be reflected in the transparent display 151. Accordingly, the transparent display 151 itself, together with the first housing 101 and the second housing 103, may form an external appearance of the mobile terminal 100.

The transparent display 151 displays (or outputs) information processed by the mobile terminal 100. For example, the transparent display 151 may display information about an execution screen of an application driven in the mobile terminal 100 or information about a user interface (UI) and/or graphic user interface (GUI) according to the information about the execution screen.

The transparent display 151 may include at least one of a liquid crystal display (LCD), a thin film transistor liquid crystal display (TFT LCD), an organic light-emitting diode (OLED), a flexible display, a three-dimensional (3D) display, and an electronic-ink (e-ink) display.

A representative example of the transparent display 151 may be a transparent OLED (TOLED). The back structure of the transparent display 151 may also have a light transmissive type structure. In such a structure, a user may view an object placed at the back of the terminal body through an area occupied by the transparent display 151.

Furthermore, two or more transparent displays 151 may be present depending on an implementation type of the mobile terminal 100. In this case, a plurality of displays may be disposed in one surface of the mobile terminal 100 in the state in which the plurality of displays has been spaced apart from one another or has been integrated. Furthermore, a plurality of displays may be disposed in different surfaces of the mobile terminal 100.

Touch panels 151c and 151d may be included in the front and rear surfaces of the transparent display 151. The touch panels 151c and 151d may include a first touch panel 151c included in the front surface of the transparent display 151 and a second touch panel 151d included in the rear surface of the transparent display 151. That is, a user may view an image both in the front and rear surfaces of the transparent display 151, and touch input of a user may also be performed in the front and rear surfaces of the transparent display 151.

The transparent display 151 may include a touch sensor for detecting a touch on the transparent display 151 so that a control command can be received according to a touch method. The transparent display 151 may be configured so that the touch sensor detects a touch and the controller 180 generates a control command corresponding to the touch if the touch on the transparent display 151 is performed using the touch sensor. Contents inputted using the touch method may be alphabetical letters or numbers or may be menu items that may be instructed or designated in a variety of types of mode.

The touch sensor is configured in the form of a film including a touch panel. The touch sensor may be disposed between a window and the transparent display 151 on the rear surface of the window or may be a metal wire directly pattern on the rear surface of the window. In some embodiments, the touch sensor may be integrated with the transparent display 151. For example, the touch sensor may be disposed on the substrate of the transparent display or may be included within the transparent display.

As described above, the transparent display 151 may form a touch screen along with the touch sensor. In this case, the touch screen may function as the user input unit 123 (refer to FIG. 1). In some embodiments, the touch screen may replace at least some functions of a manipulation unit.

A variety of types of electronic parts may be disposed in internal spaces formed in the first housing 101 and the second housing 103. The first and the second housings may be formed by injecting synthetic resin or may be made of metal, for example, stainless steel STS, aluminum (Al), or titanium (Ti).

The first housing 101 may include a second camera 121a, a proximity sensor 141, an illumination sensor 142, an audio output module 152, an optical output module 154, and an interface unit 160. Furthermore, the second housing 103 may include a microphone 122 and a power supply unit 191. In FIG. 2a, the power supply unit 191 has been illustrated as an electronic part which may be included in the second housing 103, but various electronic parts may be mounted on the second housing 103. Furthermore, such elements are not limited to such a disposition. The elements may be excluded or replaced with other elements, if necessary, or may be disposed in another surface. Furthermore, in addition to the aforementioned elements, required elements may be added to the first housing and the second housing and may be disposed at proper locations.

The second camera 121a process the video frame of a still image or moving image obtained by the image sensor in photographing mode or video telephony mode. The processed video frame may be displayed on the transparent display 151 and may be stored in the memory 170.

The interface unit 160 becomes a passage through which the mobile terminal 100 is connected to an external device. For example, the interface unit 160 may be at least one of a connection terminal for connection with another device (e.g., an earphone and/or an external speaker), a port for short-range communication (e.g., an infrared (IrDA) port, a Bluetooth port and/or a wireless LAN port], and a power supply terminal for supplying power to the mobile terminal 100. The interface unit 160 may be implemented in the form of a socket for receiving an external type card, such as a subscriber identification module (SIM), a user identity module (UIM), or, a memory card for storing information.

In FIG. 2b, a first camera 121b may be disposed in the rear surface of the first housing 101. In this case, the first camera 121b has a photographing direction that is substantially opposite the direction of the second camera 121a. The second camera 121a may have low pixels such that it can capture an image of the face of a user and send the image to a receiving part during video telephony, whereas the first camera 121b has high pixels such that it can capture an image of a general object and does not immediately send the image in many situations. The first camera 121b may include a plurality of lenses arranged in at least one line. The plurality of lenses may be arranged in a matrix form. Such a camera may be called an "array camera." If the first camera 121b is formed of such an array camera, it can capture an image in various ways using the plurality of lens and may obtain an image of better quality. Although not shown, a flash may be disposed in proximity to the first camera 121b. The flash lights an object when the first camera 121a takes a picture of the object.

The second housing 103 includes the power supply unit 190 (refer to FIG. 1) for supplying power to the mobile terminal 100. The power supply unit 190 may include a battery 191 which is embedded in the terminal body or configured to be detachable to the outside of the terminal body.

The microphone 122 is configured to receive a user voice and other sounds. The microphone 122 may be included in a plurality of places to receive a stereo sound.

Although not shown, at least one antenna for wireless communication may be included in any one of the first housing 101 and the second housing 103. The antenna may be embedded in the terminal housing. For example, an antenna forming part of the broadcast receiving module 111 (refer to FIG. 1) may be configured to be drawn from the terminal housing. In some embodiments, the antenna may be formed in a film type and may be attached to the internal surface of the second housing 103.

As shown in FIG. 2c, if the first housing 101 and the second housing 103 are integrated with side frames 105a and 105b, the side frames 105a and 105b including conductive materials may be configured to function as antennas.

The configuration of the mobile terminal 100 having an external appearance of a type in which the transparent display 151 is supported through the first housing 101 and the second housing 103 has been described above with reference to FIGS. 2a and 2b. That is, in the case of FIGS. 2a and 2b, the top of the transparent display 151 is supported by the first housing 101 and the bottom thereof is supported by the second housing 103, but both sides of the transparent display 151 do not include a support structure.

However, an embodiment of the present invention is not limited to such a configuration. For example, a structure supporting the transparent display 151 is described with reference to FIG. 2c. The first housing 101 and the second housing 103 may be connected by the side frames 105a and 105b, thus being capable of forming a single structure. The structure functions as a side frame. The transparent display 151 may be inserted into the side frame, thus being capable of forming an external appearance of the mobile terminal 100.

Although not shown, in FIG. 2c, the side frames 105a and 105b may be equipped with various manipulation units. The manipulation units may include a menu, a home key, and units for receiving commands, such as cancel and search, for example. Furthermore, for example, the manipulation unit may control the volume of a sound output through the audio output module or receive a command for touch recognition mode or a switching command for image capture mode for the transparent display 151.

Unlike in the external appearance described with reference to FIGS. 2a to 2c, the transparent display 151 may have an external appearance supported by only one of the first housing 101 and the second housing 103.

Furthermore, the first housing 101 and the second housing 103 shown in FIGS. 2a and 2b may be implemented in such a way as to be detachable from the transparent display 151. Accordingly, the use of the mobile terminal 100 may be simplified so that only a required function is implemented through the transparent display 151 depending on the type of electronic part included in the first housing 101 or the second housing 103.

For example, referring to FIG. 2a, the second camera 121a is provided in the front surface of the first housing 101 and the first camera 121b is provided in the rear surface of the first housing 101. If only an image is to be captured through the transparent display 151, the second housing 103 may be detached from the transparent display 151, and thus the mobile terminal 100 may be used in the state in which it includes only the first housing 101. In the case where a variety of types of mobile communication modules are included in the second housing 103, if a video call, a voice call, etc. are chiefly used, the first housing 101 may be detached from the transparent display 151, and the mobile terminal 100 may be used.

FIG. 3 is a flowchart illustrating a method of controlling the mobile terminal in accordance with an embodiment of the present invention. FIG. 4 is a diagram showing the state in which a back object is projected through the transparent display.

Referring to FIG. 3, the controller 180 of the mobile terminal 100 may receive predetermined input in the state in which an object 20 at the back has been projected through the transparent display 151 at step S100.

Referring to FIG. 4, when a user is placed at the back of the mobile terminal 100 and the object 20 at the back is reflected in the transparent display 151, the user may monitor an object 21 reflected in the transparent display 151.

The size 21a, 21b, or 21c of the object 21 reflected in the transparent display 151 may be different depending on a distance D1 between the object 20 at the back and the transparent display 151. For example, as the distance between the object 20 at the back and the transparent display 151 is reduced, the size of the reflected object 21 is increased. In particular, if the transparent display 151 has been placed on the ground, the size of an object reflected in the transparent display 151 is the same as the actual size of an object included in the ground.

Accordingly, as disclosed in an embodiment of the present invention, the size of an image captured through the transparent display 151 can be controlled by controlling the distance between the object 20 at the back and the transparent display 151.

The controller 180 may receive predetermined input in the state in which a back object has been reflected in the transparent display 151. The predetermined input may be input for driving the camera.

The predetermined input may include touch input of a predetermined pattern to the transparent display 151. The predetermined pattern may include touch & drag input and touch & drag input according to a multi-touch. For example, the predetermined pattern may include input in which a multi-touch is performed on three points and then dragged. Furthermore, for example, the predetermined pattern may include a contour drawn along the boundary area of the transparent display 151.

As described above (refer to FIG. 2a), the transparent display 151 can detect a touch on a front touch screen of the transparent display 151 because it may be integrated with the touch panel.

The predetermined input is not limited to the above example. For example, the predetermined pattern may include a movement (e.g., shaking) of the mobile terminal 100 having a predetermined shape through the posture detection sensor and acceleration sensor of the mobile terminal 100. That is, if a user shakes the mobile terminal in the state in which an object to be captured by the user has been reflected in the transparent display 151, the camera may be automatically executed, and the capturing of an image of the object may be performed.

Furthermore, the predetermined input may include input received when the transparent display 151 is a deactivation state.

The deactivation state of the transparent display 151 may include the state in which the supply of power to the transparent display 151 is blocked and no information is provided through the transparent display 151. Although power is not supplied to the transparent display 151 as described above, a back object may be reflected in the transparent display 151 so that a user can monitor the object at the back.

Accordingly, the mobile terminal 100 in accordance with an embodiment of the present invention may perform control so that the predetermined input (e.g., the detection of touch input or the detection of motion input) although the supply of power to the transparent display 151 is blocked. Touch input received in the state in which the transparent display has been deactivated may be recognized as a wakeup signal for detecting the touch input on the transparent display 151.

The deactivation state of the transparent display 151 may include the state in which power is supplied to the transparent display 151, specific information can be provided through the transparent display 151, and lock mode can be released by a manipulation of the transparent display 151 or another predetermined manipulation. In this case, the state in which a lock screen has been provided to the transparent display 151 includes the state in which the lock screen has been maintained. In accordance with an embodiment of the present invention, the camera may be automatically executed without a lock release process when predetermined input is received even in the state in which the lock screen has been maintained.

Referring back to FIG. 3, the controller 180 may execute the first camera (refer to 121b of FIG. 2b) configured to capture an image at the back of the mobile terminal on the predetermined input at step S110.

That is, when touch & drag input according to a multi-touch is received by the transparent display 151 in which the object at the back has been reflected, the controller 180 automatically drive the first camera without additional input for driving the first camera.

Accordingly the controller 180 may provide a preview screen obtained through the first camera to the transparent display 151. In this case, the image provided through the preview screen may be the same as the image of the background at the back which was projected through the transparent display 151.

The controller 180 may determine whether the transparent display 151 in which the object at the back is reflected is spaced apart from the object at the back at a predetermined distance at step S120.

If, as a result of the determination, it is determined that the transparent display 151 is spaced apart from the object at the back by the predetermined distance, the controller 180 may control the first camera so that it photographs the object at the back at step S130.

The predetermined distance means the distance between the object at the back and the transparent display 151 when the entire object at the back which is reflected in the transparent display 151 is displayed on the preview screen according to the execution of the first camera at a point of time at which the first camera is executed.

More specifically, the predetermined distance may mean a vertical distance between the transparent display 151 and a virtual plane including the object at the back. The transparent display 151 may be spaced apart from the virtual plane in the vertical upward direction. If the isolation distance of the transparent display 151 reaches the distance in which the projected object prior to the driving of the first camera (i.e., the size of a region to be photographed by the user) is included in the transparent display 151, the controller 180 automatically controls the first camera so that image capture is performed in the isolation distance.

The controller 180 may temporarily store the range (or size) of the image reflected in the transparent display 151 at a point of time (or right before the point of time) at which the first camera is driven. For example, when the predetermined input is received by the transparent display 151, the controller 180 may perform screen capture and may drive the first camera right before or after the screen capture is performed so that the preview screen of the first camera is provided to the transparent display 151.

An embodiment of the present invention is not limited to the aforementioned method and may be applied to various methods of recognizing a view (i.e., desired view) to be photographed.

That is, in order to check a point of time at which the object at the back is photographed when the mobile terminal 100 is spaced apart from the object at the back after the first camera is driven, it is necessary to recognize the range (or size) of the image seen through the transparent display 151 right before the mobile terminal 100 becomes distant from the object.

An embodiment in which an image is automatically captured when the mobile terminal 100 is spaced apart from the ground at a specific distance in the state in which the mobile terminal 100 has been placed on the ground is described below.

FIGS. 5 to 13b are diagrams illustrating a method of controlling the mobile terminal in accordance with a first embodiment of the present invention.

The method of controlling the mobile terminal in accordance with the first embodiment of the present invention may be implemented in the mobile terminal 100 described with reference to FIGS. 1 to 2c. The method of controlling the mobile terminal in accordance with the first embodiment of the present invention and an operation of the mobile terminal 100 for implementing the method are described in detail with reference to required drawings.

FIGS. 5 to 6b are diagrams illustrating step S100 of FIG. 3.

Hereinafter, a movement of the transparent display 151 is the same as a movement of the mobile terminal 100. Accordingly, the isolation distance of the mobile terminal 100 placed on the ground in the vertical upward direction is assumed to be the same as the isolation distance of the transparent display 151.

It is assumed that the transparent display 151 is placed on the ground 30 in the state in which the specific object 20 has been placed on the ground 30. In this case, the transparent display 151 may be a deactivation state. That is, the supply of power to the transparent display 151 may have been blocked.

A user may monitor an object 20? reflected in the transparent display 151. In this case, the controller 180 of the mobile terminal 100 does perform control so that the projected image 20? is displayed on the transparent display 151.

Referring to FIGS. 6a to 6b, the controller 180 receives touch input having a specific pattern with respect to the transparent display 151 in the state in which the projected object 20? is viewed. The specific pattern may be previously set by the user. For example, the specific pattern may be a pattern P1 that is dragged in a specific direction in the state in which three fingers of the user have been simultaneously touched on the transparent display 151. For another example, the specific pattern may be drag input P2 that draws a contour of a square along the corner area of the transparent display 151.

The mobile terminal 100 remains placed on the ground 30 while it receives the predetermined input.

FIG. 7 is a diagram showing the shape of the transparent display in the state in which the first camera has been executed.

Referring to FIG. 7, the controller 180 drives the first camera (refer to 121b of FIG. 2b), provided at the back of the first housing 101, in response to the predetermined input and proves the transparent display 151 with an image captured by the first camera.

In the case of FIG. 7, however, since the transparent display 151 comes in contact with the ground 30, a view angle in which the image may be captured by the first camera 121b may not be present. Accordingly, if the transparent display 151 has been placed on the ground 30, no image can be seen through the transparent display 151. In this case, the object 20 placed on the ground 30 may not be reflected in the transparent display 151.

FIGS. 8a to 8c are diagrams illustrating an example in which an image is captured depending on the distance of the mobile terminal in accordance with the first embodiment of the present invention from a back object.

Referring to FIG. 8a, if the mobile terminal 100 is spaced apart from the ground 30 at the first distance D1, the first camera 121b captures a preview image 42 at a first distance d1 and provides the preview image 42 to the transparent display 151. The preview image 42 includes a range in which at least part of the image 20? reflected in FIG. 5 has been enlarged, but does not include the entire size of an object reflected before the first camera is driven.

Referring to FIG. 8b, if the mobile terminal 100 is spaced apart from the ground 30 by a second distance D2 and the entire object 20 is included in a preview screen, the controller 180 recognizes a point of time at which the mobile terminal 100 has been spaced apart from the ground 30 at the second distance D2 as a point of time at which an image has been captured.

The controller 180 controls the first camera so that it captures an image displayed on the transparent display 151, that is, the image displayed on the preview screen, at the point of time at which the image is captured. At this time, the controller 180 may perform auto-focusing at the point of time at which the image is captured and display auto focus guide (AFG) on the preview screen 42.

The first camera 121b captures the image based on a result of the auto-focusing. When the image is captured, the controller 180 may output a feedback signal for feeding the image capture back. The feedback signal may be a specific feedback sound output through the audio output module. Furthermore, the feedback signal may be vibration output through the haptic module. Furthermore, the feedback signal may include light output through the optical output module.

When a user separates the transparent display 151 from the ground surface 30 in the vertical upward direction, the transparent display 151 may be stopped at a the third distance D3 longer than the second distance D2 after passing by the second distance D2. Since speed at which the transparent display 151 passes by the second distance D2 is fast, a point of time at which an image at the second distance D2 is captured may be delayed unless the controller 180 instantaneously captures an image displayed on a screen at the second distance D2.

In preparation for such a case, referring to FIG. 8c, the controller 180 may capture an image 44 displayed on a screen at the third distance D2. In this case, the captured image 44 has a smaller size than the designation view (refer to FIG. 5) and includes a ground part 45 in addition to the object 20.

The mobile terminal 100 in accordance with an embodiment of the present invention may perform image capture in a specific section before/after the second distance when the second distance D2 is an image capture distance.

FIGS. 9 and 10 are diagrams illustrating an example in which continuous photographing is performed depending on the distance of the mobile terminal in accordance with the first embodiment of the present invention from a back object.

Referring to FIG. 9, the controller 180 may set the section between a first distance D11 shorter than a reference isolation distance $d_{Ref}$ at a point of time at which an image is captured and a second distance D22 longer than the reference isolation distance as a capture section.

In this case, if the mobile terminal 100 passes by the first distance D11 from the ground surface 30 and then passes by the second distance D22 while it is spaced apart from the ground surface 30 in the vertical upper direction, the controller 180 may perform control so that images are continuously captured in the capture section. Accordingly, a user may select a required image from a plurality of the images continuously captured in the capture section.

The capture section may be previously set by before the mobile terminal 100 is spaced apart from the ground surface 30 in the vertical upward direction. For example, the mobile terminal 100 may recognize the size of the object 20 reflected therein (through a method, such as the aforementioned screen capture) in the state in which it has been placed on the ground surface 30. When the first camera 121b is executed, the first camera 121b may automatically calculate a focal distance in which the size of the recognized object 20 is included in the preview screen and calculates the reference isolation distance $d_{Ref}$ based on the calculated focal distance. After the reference isolation distance $d_{Ref}$ is calculated, the distance of the capture range may be determined by taking a specific error range into consideration.

Referring to FIG. 10, the controller 180 may sequentially display the plurality of images, continuously captured in the capture section of FIG. 9, on the transparent display 151 through touch input (e.g., flicking input or drag input) to the transparent display 151.

A first image C1 captured at the first distance D11 may be an image that belongs to the designation view of the object 20 (i.e., the actual size of the object) and that has been obtained by zooming in at least one point of the designation view. A second image C2 captured at a distance longer than the first distance D11 has been controlled so that it is closer to the designation view compared to the first image. A third image captured at the reference isolation distance $d_{Ref}$ has been captured to have the same size as the designation view. A fifth image C5 captured at the second distance D22 after passing by the reference isolation distance $d_{Ref}$ may include part of the ground surface 30 in addition to the designation view.

FIG. 11 is a diagram illustrating an example of an image processing method if an image is captured away from a designation distance between the mobile terminal in accordance with the first embodiment of the present invention and a back object.

Referring to FIG. 11, if an image captured by the first camera 121b includes a region in addition to an object reflected in the transparent display 151 (hereinafter referred to as a designation view) before the first camera 121b is executed, the controller 180 may separate only the designation view region from the image captured by the first camera 121b and store the separated region.

For example, if an isolation distance of the mobile terminal 100 is the second distance D22 not the reference isolation distance $d_{Ref}$, a captured image C11 including a background part in addition to the designation view may be displayed on the transparent display 151. The controller 180 may separate only a designation view region C11' from the captured image C11, may store the separate designation view region C11', and may display an image of the separated designation view region C11' on the transparent display 151.

In the example of FIG. 11, it is assumed that an isolation distance is different, but an angle formed by the mobile terminal 100 and the ground surface 30 is the same as an angle in which the mobile terminal 100 is placed on the ground surface 30.

However, there is a possibility that while a user separates the mobile terminal 100 from the ground surface 30, an angle formed by the main body of the mobile terminal 100 and the ground surface 30 may be changed.

FIG. 12 is a diagram illustrating an example of an image processing method if an image is captured away from a designation angle formed between the mobile terminal in accordance with the first embodiment of the present invention and a back object.

Referring to FIG. 12, while the mobile terminal 100 is spaced apart from the ground surface 30, an angle formed by the mobile terminal 100 and the ground surface 30 may be changed and at the same time, an image C21 captured after the mobile terminal 100 passes by the reference isolation distance $d_{Ref}$ may be provided to the transparent display 151. Likewise, in this case, the controller 180 may separate only a designation view region C21? from the captured image C21, may store the separated designation view region C21', and may display the separated image C21' on the transparent display 151. In this case, if both the isolation distance and the isolation angle are not the same as previously designated reference isolation distance and angle, there may be a distortion of an image.

If the mobile terminal 100 is spaced apart from the ground surface 30 and the condition of the reference isolation distance $d_{Ref}$ is satisfied as described above, the first camera 121b captures an image by performing auto-focusing.

In accordance with an embodiment of the present invention, an image may be captured at the reference isolation distance $d_{Ref}$, but an image may be captured according to a user's intention regardless of the reference isolation distance $d_{Ref}$.

FIGS. 13a to 13b are diagrams illustrating an example in which an image is captured in the state in which the mobile terminal in accordance with the first embodiment of the present invention has deviated from a designation distance between the mobile terminal and a back object.

Referring to FIGS. 13a and 13b, the mobile terminal 100 has been spaced apart from the ground surface 30 and thus the first camera 121b has been driven. In this case, the mobile terminal 100 may capture a required image in response to user setting although the condition of the reference isolation distance $d_{Ref}$ is satisfied.

Referring to FIG. 13a, when touch input to a specific point on a preview image 20_a is received in the state in which the isolation distance D11 of the mobile terminal 100 is shorter than a reference isolation distance $d_{Ref}$, the mobile terminal 100 performs focusing based on the touch point. The controller 180 may capture an image based on a designated focus and display focus guide FG at a corresponding touch point. Accordingly, if a specific region of a designation view is to be enlarged and an image is to be captured, the mobile terminal 100 may capture a required image through additional focusing input although it has an isolation distance shorter than the reference isolation distance $d_{Ref}$.

Referring to FIG. 13b, if a region other than a designation view is to be focused and an image is to be captured, the isolation distance D22 of the mobile terminal 100 may be increased longer than the reference isolation distance $d_{Ref}$, and an image 20_b including a background in addition to a designation view 20" may be obtained. Accordingly, the mobile terminal 100 may set a focus through user input with respect to a specific region included in the background, and the controller 180 may perform image capture based on the specific region.

The first embodiment of the present invention has been described above. A second embodiment of the present invention relates to a method of capturing an image using the transparent display 151 in the state in which the mobile terminal 100 has not been placed on the ground.

FIGS. 14a to 14c are diagrams illustrating an example in which an image is captured in accordance with the second embodiment of the present invention.

In the second embodiment of the present invention, it is assumed that a user performs capturing by carrying the mobile terminal 100.

Referring to FIG. 14a, a user designates a background B to be photographed and places the transparent display 151 in front of a desired object. A method of driving the first camera 121b in the state in which the transparent display 151 has been deactivated has been described in the first embodiment. When predetermined input to the transparent display 151 is received in the state in which the background B at the back has been reflected in the transparent display 151, the controller 180 may drive the first camera 121b and provide a preview screen to the transparent display 151.

Referring to FIG. 14b, when touch input to a specific object OB1 on the preview screen is received, the controller 180 may previously set a focus based on the specific object OB1.

Referring to FIG. 14c, if the mobile terminal 100 is spaced apart from the background at the back from a reference isolation distance $d_{Ref}$, the controller 180 may perform control so that image capture is automatically performed based on the set focus.

FIGS. 15a to 15b are diagrams illustrating another example in which an image is captured in accordance with the second embodiment of the present invention.

Referring to FIG. 15a, when predetermined input is received in the state in which in a background B at the back has been reflected in the transparent display 151, the controller 180 drives the first camera 121b. The controller 180 may receive touch input that designates an object designated by a user in a screen provided to the preview screen of the first camera 121b. For example, the touch input may include a touch pattern forming a looped curve including the object.

If the mobile terminal 100 is spaced at the point of a reference isolation distance $d_{Ref}$, the controller 180 may capture an image at the point [Capture], but may separate only a designated object DA from the captured image and provide the separated object DA to the transparent display 151 [Display 1]. When specific touch input to a background region BL other than the designated object DA is received, the controller 180 may display an image, displayed up to the remaining regions other than the designated object DA, on the transparent display 151 [Display 2].

The second embodiment of the present invention has been described above. In the case of the first embodiment and second embodiment of the present invention, if a specific image capture condition is satisfied, the mobile terminal 100 including the transparent display 151 may automatically drive the camera and capture an image. The image capture condition may include the reference isolation angle of the mobile terminal 100, whether a designation view is included in a preview screen when the mobile terminal 100 is spaced apart from an object, and whether a reference isolation distance is satisfied.

While a user separates the transparent display 151 from an object, a reference isolation angle, a reference isolation distance, etc. may not be satisfied. An embodiment of the present invention may provide a guide on which an image may be captured through the transparent display 151.

FIG. 16 is a flowchart illustrating a method of controlling the mobile terminal in accordance with a third embodiment of the present invention. FIGS. 17a to 18b are diagrams illustrating an example in which guide information for image capture is provided in accordance with the third embodiment of the present invention.

The method of controlling the mobile terminal in accordance with the third embodiment of the present invention may be implemented in the mobile terminal 100 described with reference to FIGS. 1 to 2c. The method of controlling the mobile terminal in accordance with the third embodiment of the present invention and the operation of the mobile terminal 100 for implementing the method are described in detail below with reference to required drawings. The third embodiment may be performed based on the first embodiment and/or the second embodiment.

Referring to FIG. 16, the controller 180 drives the first camera 121b in response to predetermined input in the state in which an object at the back has been reflected. The controller 180 checks whether the transparent display 151 has been spaced apart from the object at the back at a predetermined distance. Such a process corresponds to steps S100, S110, and S120 of FIG. 3, and thus a further description thereof is omitted.

When the first camera 121b is executed, the controller 180 may display, on the transparent display 151, guide information indicative of at least one of the isolation distance of the transparent display 151 and an angle formed by the transparent display 151 and the object so that a condition in which an image is captured by the first camera 121b is satisfied at step S200.

If a view angle of the camera 121b becomes an angle in which a designation view can be covered, separate guide information may not be provided.

Referring to FIGS. 17a and 18a, in the first embodiment of the present invention, the first camera 121b may be driven in the state in which the mobile terminal 100 has been placed on the ground. If an image is not captured for a predetermined time after the first camera 121b is driven, the controller 180 may display guide information G1 and G2, including an image capture condition, on the transparent display 151. The guide information G1 and G2 may include text and/or a graphic object indicative of the isolation of the mobile terminal 100.

In the example of FIGS. 17b and 18b, the mobile terminal 100 has satisfied a reference isolation distance and has been spaced apart from the ground based on the guide G1 and G2 first provided in FIGS. 17a to 18a. If at least part of the designation view is not included in a preview screen, however, the controller 180 may display the guide information G1 and G2 indicative of a movement of the location of the mobile terminal 100 on the transparent display 151 so that the entire designation view is included in the preview screen.

The guide information may be provided in real time until the capturing of an image is terminated after the first camera 121b is driven.

FIG. 19 is a diagram illustrating an example in which guide information is displayed in accordance with the third embodiment of the present invention. Referring to FIG. 19, a projected image 10? of a user 10, together with a projected image 20? of an object 20 at the back, may be reflected in the transparent display 151. In addition, the mobile terminal 100 may display specific information (e.g., guide information 50) on the transparent display 151 as in the third embodiment of the present invention. In this case, if an object in front of the transparent display 151 and an object at the back of the transparent display 151 are overlapped and reflected in the transparent display 151 and overlapped with the guide information 50, the visibility of the guide information may be deteriorated. Accordingly, if the guide information 50 is to be displayed on the transparent display 151, the controller 180 may reduce the transparency of the transparent display 151 in order to increase the visibility of the guide information 50.

FIGS. 20a to 21 are diagrams illustrating examples in which images captured through the mobile terminal are used in accordance with an embodiment of the present invention.

In accordance with an embodiment of the present invention, images simply captured through the first embodiment, the second embodiment and/or the third embodiment may be used in various applications.

Referring to FIG. 20a, the controller 180 may display an image captured by the first camera 121b on the transparent display 151 and at the same time, provide a menu for processing the image to the transparent display 151.

The menu may include an edit menu M1, a storage menu M2, and a sharing menu M3. The menus may be provided to the upper and lower sides of the transparent display 151. For example, if a captured image C5 is a business card, when input for dragging the captured image C5 to the storage menu M2 is received, the controller 180 may match information included in the business card with each field of a contact screen and automatically store the matched information.

Referring to FIG. 20b, when input for dragging a captured image to the sharing menu M3 is received, the controller 180 may provide a sharing list item. The sharing list item may include an e-mail application, a messenger application, an application for short-range communication connection, etc.

Referring to FIG. 20c, if a captured image is a common photo, when input for dragging the captured image to the storage menu M2 is received, the controller 180 may store the captured image in a specific folder of a gallery application.

Referring to FIG. 20d, if a captured image is a common photo, when input for dragging the captured image to the edit menu M1 is received, the controller 180 may drive an image edit application for providing various edit tools EM.

Referring to FIG. 21, the controller 180 may perform control so that mode in which memo input HW is possible with respect to an image captured by the first camera 121b through handwriting input is entered. Furthermore, when predetermined input to a displayed image is received in the state in which the controller 180 has displayed the image captured by the first camera 121b on the transparent display 151, the controller 180 may perform control so that the back of the displayed image is displayed on the transparent display 151 and mode in which handwriting input HW is possible through the back of the displayed image is entered.

The controller 180 may provide meta information, such as information about an image capture time and a capture place, to the back of the displayed image.

FIG. 22 is a diagram illustrating a method of controlling the mobile terminal in accordance with a fourth embodiment of the present invention.

Referring to FIG. 22, when predetermined input for image capture is received in the state in which a background B at the back has been reflected in the transparent display 151, the controller 180 may directly capture an image based on an image reflected in the transparent display 151 without separately providing a preview screen according to the first camera 121b. The image captured as described above may be stored in the secret folder of a gallery, and the secret folder may be open through user authentication.

The mobile terminal and the methods of controlling the mobile terminal according to the embodiments of the present invention have the following advantages.

In accordance with an embodiment of the present invention, there can be provided a user interface which enables a user to control the mobile terminal more efficiently using the characteristics of the transparent display.

Furthermore, in accordance with an embodiment of the present invention, an image required by a user can be captured using a simple method without additional input in the state in which the transparent display has been deactivated.

Furthermore, in accordance with an embodiment of the present invention, a required image can be obtained although there is a movement of the mobile terminal because an image is captured based on an image projected through the transparent display.

Furthermore, in accordance with an embodiment of the present invention, efficiency of image capture can be improved through the transparent display because a photographing guide is provided so that an image projected through the transparent display is accurately captured.

Furthermore, in accordance with an embodiment of the present invention, a quick shot in which a required image is provided using a simpler method through the transparent display at a desired point of time is made possible.

The methods of controlling the mobile terminal which may be implemented in the mobile terminal configured as described above and the embodiments related to the methods have been described above.

It is evident to those skilled in the art that the present invention may be materialized in other specific forms without departing from the spirit and essential characteristics of the present invention.

The aforementioned embodiments of the present invention may be implemented in a recording medium on which a program has been recorded in the form of code readable by a computer. The computer-readable recording medium includes all types of recording devices in which data readable by a computer system is stored. The computer-readable recording medium may include, for example, a hard disk drive (HDD), a solid state disk (SOD), a silicon disk drive (SDD), ROM, RAM, CD-ROM, magnetic tapes, floppy disks, and optical data storages. Furthermore, the computer-readable recording medium may be implemented in the form of carrier waves (e.g., transmission through the Internet). Furthermore, the computer may include the controller 180 of the mobile terminal. Accordingly, the detailed description should not be construed as being limited from all aspects, but should be considered to be illustrative. The scope of the present invention should be determined by reasonable analysis of the attached claims, and all changes within the equivalent scope of the present invention are included in the scope of the present invention.

SEQUENCE LISTING FREE TEXT

100: A mobile terminal 151: a transparent display
101: a first housing 103: a second housing
180: controller

The invention claimed is:

1. A mobile terminal, comprising
a transparent display;
a first camera configured to acquire an image placed at a back of the transparent display; and
a controller configured to:
execute the first camera when a predetermined input to the transparent display is received in a state in which an object placed at a back of the transparent display has been reflected in the transparent display; and
control the first camera so that the first camera captures an image if the transparent display is spaced apart from the object at a predetermined distance,
wherein the predetermined distance comprises a first distance between the transparent display and a virtual plane comprising the object before the first camera is spaced apart from the object when the entire object reflected in the transparent display is displayed on a preview screen according to the execution of the first camera at a point of time at which the first camera is executed.

2. The mobile terminal of claim 1, wherein the state in which the object has been reflected in the transparent display comprises a state in which power supply to the transparent display is off.

3. The mobile terminal of claim 1, wherein:
the transparent display comprises a touch panel, and
the predetermined input comprises touch input having a specific pattern with respect to the touch panel.

4. The mobile terminal of claim 3, wherein the touch input having the specific pattern comprises touch & drag input according to a multi-touch.

5. The mobile terminal of claim 1, wherein the controller is configured to additionally capture an image through the first camera in a second distance if the transparent display is additionally spaced apart from the object at a second distance exceeding the first distance after an image is captured in the first distance.

6. The mobile terminal of claim 1, wherein the controller is configured to perform auto-focusing if the entire object is included in the transparent display.

7. The mobile terminal of claim 1, wherein the predetermined distance comprises a vertical distance.

8. The mobile terminal of claim 1, wherein the controller is configured to perform additional photographing on a section before and after a specific section based on a point of time at which the image is captured by the first camera.

9. The mobile terminal of claim 1, wherein the controller is configured to separate only a reflected object region and store the separate region if the image captured by the first camera comprises a region in addition to an object reflected in the transparent display before the first camera is executed.

10. The mobile terminal of claim 1, wherein the controller is configured to perform focusing based on an object corresponding to a specific point on a preview screen of the first camera and to capture an image when touch input to the specific point is received.

11. The mobile terminal of claim 1, wherein in a case where the first camera is executed after touch input to designate a specific object in a screen projected onto the transparent display is received, the controller is configured to separate only the designated specific object from the image captured by the first camera and display the separated object on the transparent display, if the specific object is included in the preview screen of the first camera while the transparent display is spaced apart from an actual object corresponding to the specific object.

12. The mobile terminal of claim 11, wherein the controller is configured to display the image captured by the first camera, comprising the designated specific object, on the transparent display when predetermined input to the transparent display is received in the state in which only the specific object has been separated and displayed.

13. The mobile terminal of claim 1, wherein the controller is configured to display guide information indicative of at least one of an isolation distance of the transparent display, an angle formed by the transparent display and the object, and a movement of the mobile terminal on the transparent display so that a condition in which an image is captured by the first camera is satisfied when the first camera is executed.

14. The mobile terminal of claim 1, wherein the controller is configured to display the image captured by the first camera and at least one menu for processing the image on the transparent display.

15. The mobile terminal of claim 1, wherein the controller is configured to:
display the image captured by the first camera on the transparent display, and
display a back of the displayed image on the transparent display when predetermined input is received with respect to the displayed image,
wherein the back of the image comprises a screen in which handwriting input is possible.

16. The mobile terminal of claim 1, further comprising at least one of an audio output module, a haptic module, and an optical output module, wherein the controller is configured to output a sound, vibration, or light for feeding image capture back through at least one of the audio output module, the haptic module, and the optical output module when the image is captured.

17. A method of controlling a mobile terminal, comprising:
receiving predetermined input to a transparent display in a state in which an object placed at a back of the transparent display has been reflected in the transparent display;
executing a first camera configured to obtain an image at the back of the transparent display; and
controlling the first camera so that the first camera captures an image if the transparent display is spaced apart from the object at a predetermined distance,
wherein the predetermined distance comprises a first distance between the transparent display and a virtual plane comprising the object before the first camera is spaced apart from the object when the entire object reflected in the transparent display is displayed on a preview screen according to the execution of the first camera at a point of time at which the first camera is executed.

* * * * *